(12) United States Patent
Collette et al.

(10) Patent No.: US 7,391,723 B2
(45) Date of Patent: *Jun. 24, 2008

(54) FRAME-LEVEL FIBRE CHANNEL CRC ON SWITCHING PLATFORM

(75) Inventors: William C. Collette, Stillwater, MN (US); Steve Flattum, Fridley, MN (US); Mark J. Vogel, Greenfield, MN (US); Bret Ketchum, Anoka, MN (US)

(73) Assignee: Computer Network Technology Corporation, Minneapolis, MN (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/420,953

(22) Filed: Apr. 22, 2003

(65) Prior Publication Data

US 2004/0015691 A1   Jan. 22, 2004

Related U.S. Application Data

(60) Provisional application No. 60/374,958, filed on Apr. 22, 2002.

(51) Int. Cl.
*H04J 3/14* (2006.01)
*H04B 10/08* (2006.01)
*H04L 9/00* (2006.01)
*H04L 12/26* (2006.01)
*H04L 12/54* (2006.01)
*H04M 13/00* (2006.01)

(52) U.S. Cl. .......... 370/230; 370/244; 370/392; 370/412; 370/429; 370/463; 370/471; 398/17; 713/160; 714/758; 714/776; 714/819

(58) Field of Classification Search .......... 370/230, 370/244, 392, 412, 429, 463, 471; 398/17; 713/160; 714/758, 776, 819

See application file for complete search history.

(56) References Cited

U.S. PATENT DOCUMENTS

| | | | |
|---|---|---|---|
| 5,588,140 A | 12/1996 | Misukanis et al. | |
| 5,598,541 A * | 1/1997 | Malladi | 710/106 |
| 5,638,518 A | 6/1997 | Malladi | |
| 5,740,186 A | 4/1998 | Widmer | |
| 5,802,080 A | 9/1998 | Westby | |
| 5,894,481 A | 4/1999 | Book | |
| 6,122,738 A | 9/2000 | Millard | |

(Continued)

*Primary Examiner*—Alpus H. Hsu
(74) *Attorney, Agent, or Firm*—Krueger Iselin LLP

(57) ABSTRACT

A method and apparatus is presented for performing a sequence-level CRC calculation on fiber channel communications within a switching platform domain. A CRC generator searches the data communication for frames that contain the type of data for which a sequence-level CRC is desired, such as for a sequence containing SCSI data. If found, and the type of data allows multiple frames per sequence, the present invention creates a CRC value for the sequence. An intermediate CRC value is stored in a queue to allow the simultaneous calculation of sequence level CRC values for multiple frames. With inbound data, the sequence-level CRC is appended to the end of the sequence data. With outbound data, the calculated value is compared with the appended, expected value. With single-frame fiber channel protocols, the frame-level CRC value is obtained directly from the frames entering the switching platform domain. This value is placed in a local queue, from which it is appended to the data payload by a processor for transmission within the switching platform. When the single frame is leaving the switching platform domain, the flow of data leaving the switching platform domain is monitored and the frame-level CRC value calculated by the fiber channel controller is replaced with the original frame-level CRC value.

17 Claims, 15 Drawing Sheets

U.S. PATENT DOCUMENTS

| | | | |
|---|---|---|---|
| 6,233,073 B1 | 5/2001 | Bowers et al. | |
| 6,279,057 B1 * | 8/2001 | Westby | 710/52 |
| 6,317,800 B1 * | 11/2001 | Westby et al. | 710/40 |
| 6,324,669 B1 | 11/2001 | Westby | |
| 6,330,626 B1 | 12/2001 | Dennin et al. | |
| 6,438,119 B1 * | 8/2002 | Kim et al. | 370/335 |
| 6,502,189 B1 * | 12/2002 | Westby | 713/1 |
| 6,647,528 B1 * | 11/2003 | Collette et al. | 714/758 |

* cited by examiner

FRAME-LEVEL FIBRE CHANNEL CRC ON SWITCHING PLATFORM

CROSS-REFERENCE TO A RELATED APPLICATION

This application claims the benefit of, and incorporates by reference, U.S. application Ser. No. 09/705,102, filed Nov. 2, 2000, and Provisional U.S. Application No. 60/374,958, filed Apr. 22, 2002.

FIELD OF THE INVENTION

The present invention relates in general to CRC error checking. More particularly, the present invention relates to a switching platform that either computes a sequence-level CRC value for multiple-frame fibre channel sequences, or passes frame-level CRC values unaltered through the switching domain for single-frame fibre channel sequences.

BACKGROUND OF THE INVENTION

In conventional networked systems, data is often transmitted between digital devices over a variety of protocols. Switching platforms exist that are capable of converting and switching data from one protocol to another. For instance, data can be transmitted by an IBM mainframe over an ESCON channel protocol. A switching platform can receive such an ESCON data stream and redirect the data over a different bus protocol like SCSI, or even a network media such as ATM. Using such devices, IBM mainframes can communicate to otherwise incompatible devices such as a SCSI storage device using a known protocol like ESCON.

Switching platforms may also allow remote access to devices that are physically located beyond the limits of a particular communications media. For instance, local fibre channel data streams can be converted to a wide area network such as SONET and then be transmitted across the continent. A separate switching platform at the receiving site can receive the network protocol data stream and convert it back to the original channel protocol or even another protocol altogether, whatever is appropriate for the receiving device.

As is well known, it is important that any data corruption along a transmission path be identified and corrected. Standard techniques for detecting data corruption include parity checks and CRCs (or cyclic redundancy checks). Parity checks require that an additional bit be added onto each byte of transmitted data. The additional bit is selected so that the entire byte contains either an odd number of 'one' bits (odd parity) or an even number of 'one' bits (even parity). Unfortunately, this error detection scheme does not check errors that create an even number of bit errors within a single byte.

The CRC technique is an improvement over simpler methods of error detection. In standard techniques, a CRC value is appended onto a grouping of data during data transmission. When the data is received, a new CRC value is calculated and compared with the original value. If the values do not match, there has been a transmission error. Alternatively, the data and the appended CRC value are combined to calculate a CRC value, which can then be compared with a constant to determine if there were any errors during transmission.

While various channel and networking protocols check for point-to-point data transmission problems using parity checking and CRC values, these end-to-end techniques are not useful in discovering data transmission problems within the switching platform domain. In other words, if transmission errors arise in the transmission from one switching platform to another, it would be inefficient to require the destination (i.e., the remote storage device) to discover the transmission problem and then request a retransmission from the source (i.e., the computer).

What is needed is a technique to calculate and check CRC values in a switching platform domain beyond that provided by the basic point-to-point protocols used by the attached devices. Specifically, what is needed is a method and device that snoops the hardware used for normal fibre channel communications to create a sequence-level CRC generator and checker.

At the same time, some fibre channel protocols such as FC-BB, FC-BB2, and FC-IP do not utilize sequences, and instead transmit data only in single fibre channel frames. When transmitting these protocols, there is no need for the switching platform domain to create a sequence level CRC value, since there are no sequences and each individual frame contains its own CRC value. This value is not recalculated within the switching domain because these fibre channel protocols require that intermediate switches existing between the originator and responder pass the frame-level CRC values unaltered. Thus, it is necessary for the method and device that generates a sequence-level CRC value for multiple-frame sequences to also allow single fibre channel frame communications of these protocols to pass through the switching domain with their frame-level CRC values unaltered.

SUMMARY OF THE INVENTION

These needs are met by the present invention technique for performing a sequence-level CRC calculation. The present invention utilizes a CRC generator to monitor data communication on a fibre channel interface. The interface is preferably used to receive and transmit data between a switching platform domain and a fibre channel connection.

With multiple-frame sequence protocols, such as fibre channel sequences containing SCSI data, the switching platform will use CRC error checking to ensure data integrity within the switching platform domain. This is accomplished by using the CRC generator to monitor data flowing through the fibre channel interface for frames that contain the appropriate type of data. When found, the CRC generator performs an 8B/10B decode, strips off any fill bytes, and performs a CRC calculation on the data payload.

If the found frame is the first frame in the sequence, the CRC calculation starts with a reset value. If the frame is not the first, an intermediate value containing the previous CRC calculation results for this sequence is retrieved and used to perform the CRC calculation. Upon completion of the calculation for the frame, a determination is made whether the sequence is complete. If so, the calculated value is the sequence-level CRC. If not, the calculated value is stored in memory for use with the next frame in that sequence.

With inbound data, the calculated sequence-level CRC is appended to the end of the data for that sequence. With outbound data, the calculated value is compared with the appended, expected value, and a CRC error is generated if the values do not match. The sequence-level CRC value appended to the sequence data payload is removed before the data exits the switching platform domain.

With single-frame fibre channel protocols, such as FC-BB, FC-BB-2 and FCIP, there is no need to create a sequence level CRC value since the single frame contains its own frame-level CRC value. In addition, the protocols themselves require that the frame be transmitted unaltered. In these circumstances, the present invention retrieves the frame-level CRC value from frames entering the switching platform domain, and places the CRC value in a local queue. The frame-level CRC value is then appended to the data by a processor when the data is transmitted within the switching platform. When the frame then leaves the switching platform domain, it is necessary to replace the frame-level CRC value calculated by the fibre channel controller on the switching platform with the original frame-level CRC value. This is accomplished by controlling and monitoring the flow of data leaving the switching platform domain. When the frame leaves the domain, the switching platform replaces the generated CRC value with the original CRC value that had been appended to the data during transmission within the switching platform domain.

DETAILED DESCRIPTION OF THE INVENTION

1. Fibre Channel Protocols

The fibre channel communications protocol is generally considered to involve five independent layers (FC-0, FC-1, FC-2, FC-3, and FC-4). FC-0 covers the physical characteristics that allow communications over a variety of physical media, such as copper wiring or fiber optics. The FC-1 layer defines the 8B/10B transmission coding developed by Widmer and Franasak of IBM. This coding converts an eight-bit byte into a ten-bit group. This 8B/10B coding creates a balanced DC-bias, and allows the clock to be recovered quickly and reliably from a serial stream. A "comma character" is used in this coding to ensure proper byte and word alignment.

Figure 1:
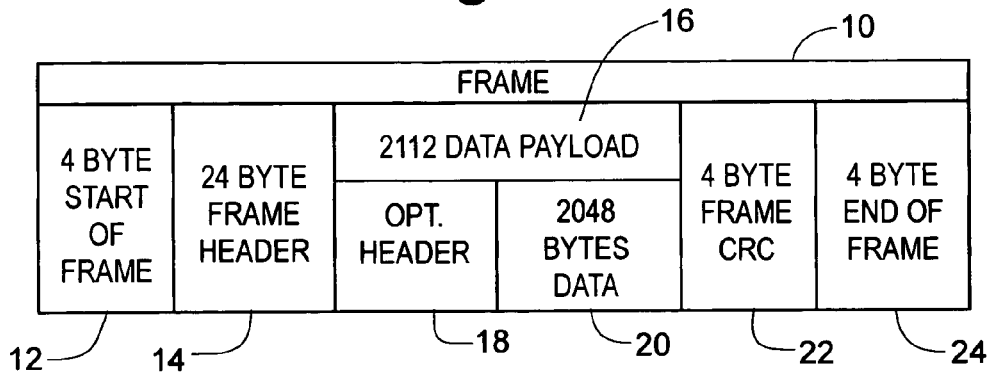
FIG. 1 is a block diagram showing the layout of a fibre channel frame.
Figure 2:
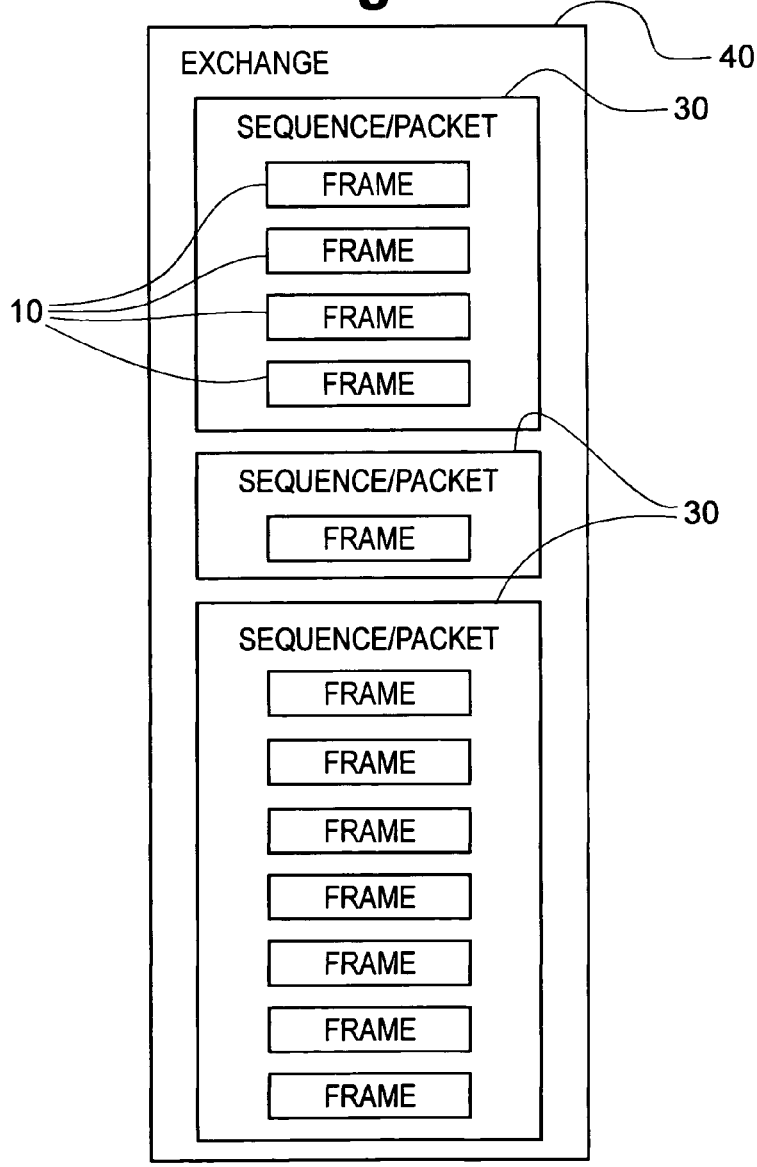
FIG. 2 is a block diagram showing the relationship between fibre channel frames, sequences, and exchanges.

The FC-2 layer defines the fibre channel framing and signaling protocol, as set forth in FIGS. 1 and 2. The smallest grouping of data used in this protocol is a frame 10, shown in FIG. 1. Frame 10 utilizes the 10 bit bytes defined in FC-1. Frame 10 also utilizes ordered sets, which are a specially defined grouping of four 10-bit bytes. Ordered sets can never be mistaken for data, and therefore can be used to provide for low-level link functions such as frame demarcation.

A frame 10 always starts with an ordered set known as the start-of-frame delimiter 12. Following this start-of-frame ordered set 12 is a 24 byte frame header 14. The frame header 14 contains basic information about the frame 10, including the type of data being transmitted, an ID identifying the sequence 30 to which the frame 10 belongs, a sequence count indicating the position of frame 10 in the sequence 30, and the exchange ID identifying the exchange 40 to which the sequence 30 belongs. Sequences 30 and exchanges 40 are described in more detail below.

After the frame header 14 is the 2112-byte data payload 16, which contains the actual data being transmitted. In some circumstances, optional headers 18 of up to sixty-four bytes are included in data payload 16 with along with 2048 bytes of actual data 20. Following the data payload 16 is the frame CRC value 22, which is four bytes in length. This value 22 contains the Cyclic Redundancy Check value for the data payload 16 in the frame 10 (i.e., a frame-level CRC value). The frame 10 then concludes with another ordered set, namely the end of frame value 24.

As seen in FIG. 2, a sequence 30 is made up of one or more related frames 10, flowing in the same direction on a link. For instance, the transmission of a large data block over a fibre channel link would constitute a single sequence 30. The FC-2 layer is responsible for dividing the data block in sequence 30 into the individual frames 10 used to transmit the data.

An exchange 40 is composed of one or more sequences 30 used to complete a single operation. For example, the operation to retrieve a single data block from a storage device involves three separate sequences 30: (i) a request for the data block (made by an "originator"); (ii) the transmission of the data block (made by a "responder"); and (iii) the completion status of the operation (made by the originator). Each of these sequences 30 is part of a single operation, namely, retrieving a data block from a storage device. Consequently, the three sequences 30 form a single exchange 40. Within a particular exchange 40, only a single sequence 30 will usually be active at a time. However, it is expected that multiple exchanges 40 may be active concurrently. The frame header 14 contains an originator ID and a responder ID, which help identify the exchange for the originating node and the responding node, respectively.

FC-3 defines various link service functions. This level of fibre channel definition is not particularly relevant to the present invention.

One of the great advantages of fibre channel is that different networking and channel protocols can utilize fibre channel for data communications. The FC-4 level defines the implementation of these different protocols. For instance, it is possible to transmit channel protocols such as SCSI (Small Computer System Interface) or HIPPI (High Performance Parallel Interface) over fibre channel links.

2. The Environment

Figure 3:
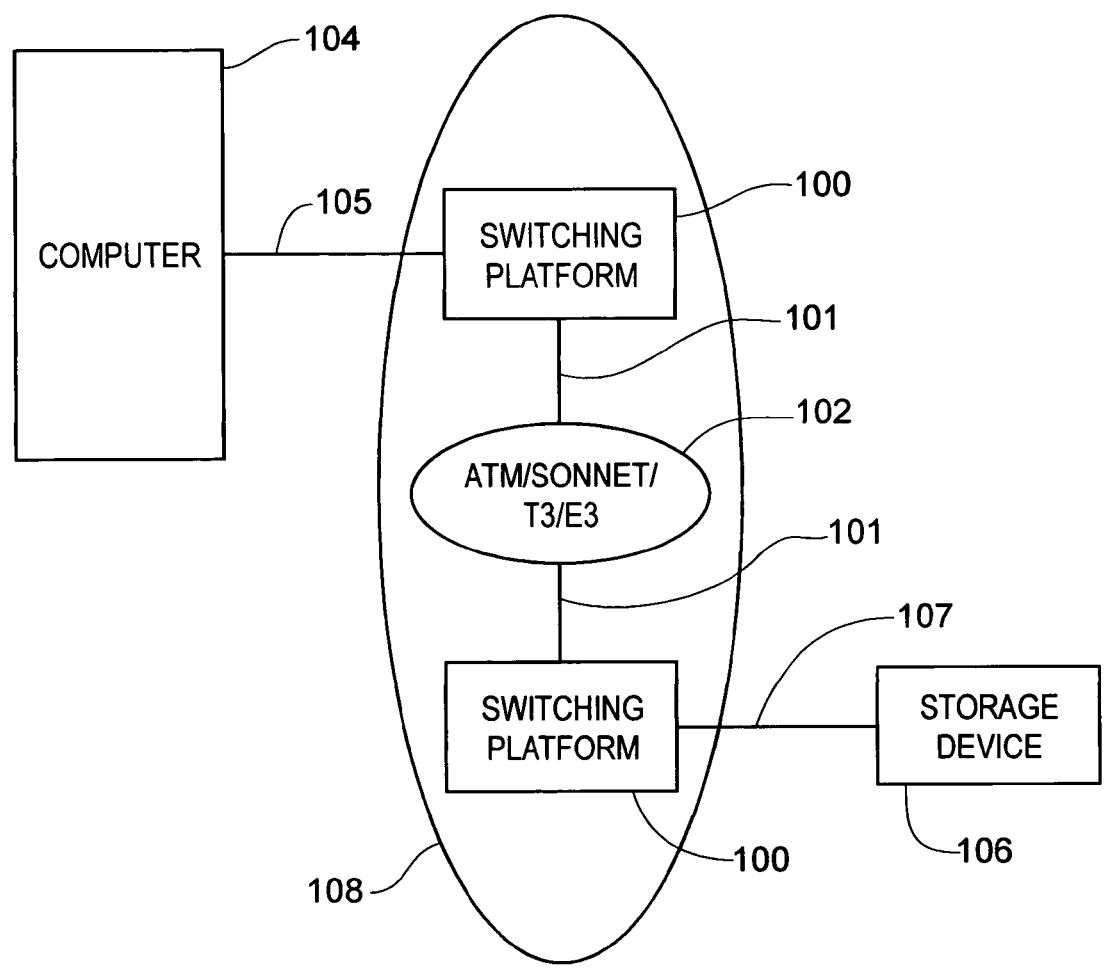
FIG. 3 is a block diagram showing the present invention in the context of a switching platform domain.

The typical environment for the use of the present invention is shown in FIG. 3. In this figure, two switching platforms 100 are shown connected through links 101 to a wide area network 102 that could utilize SONET, ATM, T3, or E3 protocols. Alternatively, the wide area network 102 could be the Internet using standard IP networking. A computer 104 may be attached to one of the switching platforms 100, while a storage device 106 may be attached to the other switching platform 100. The storage device 106 is possibly a SCSI device communicating with the switching platform over a fiber channel connection 107. The link 105 between the computer 104 and the first switching platform 100 may also be a fibre channel link, or alternatively could be a physical SCSI bus or an ESCON channel connection.

The switching platforms 100 are designed to make the computer 104 believe that it is communicating with a local storage device 106 over its preferred channel communications link 105, even though the storage device 106 may be located across the country or around the world. An example of such a switching device is the Ultranet Storage Director, produced by Computer Network Technology Corporation (Minneapolis, Minn.), the assignee of the present invention. The data communications and translations occurring within the two switching platforms 100 and the wide area network 102 are controlled by the switching platforms 100 and thus could be considered to be part of a switching platform domain 108. A method for error detection within this type of switching platform domain 108 through the generation of packet-level CRC codes in a fibre channel interface is described below. In this application, the packet-level CRC generated will be referred to as a sequence-level CRC to comply with fibre channel terminology.

3. Architecture

Figure 4:
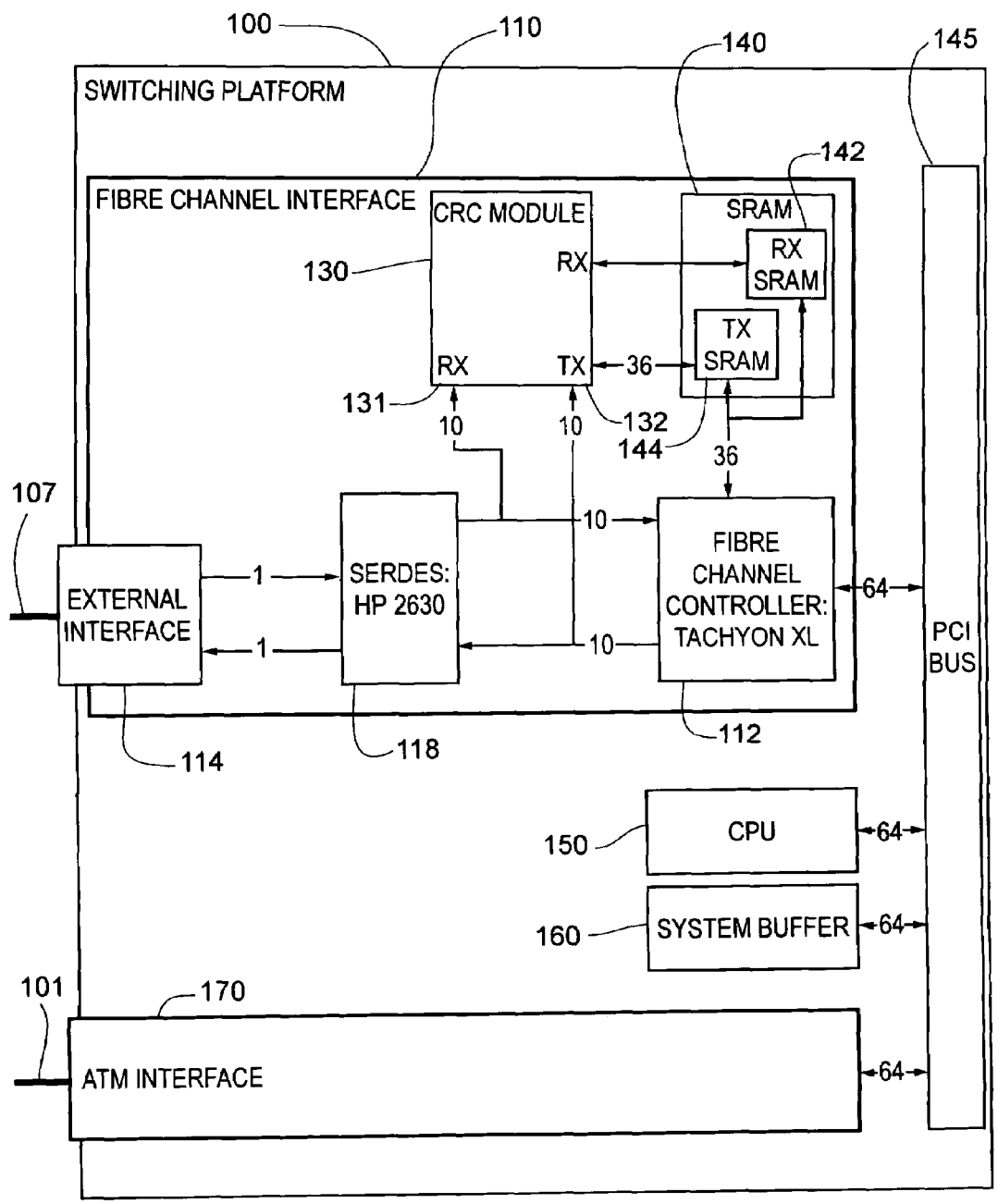
FIG. 4 is a block diagram showing the components of a fibre channel interface of the present invention in the context of a switching platform.

The architecture for such a fiber channel interface 110 is shown within a switching platform 100 in FIG. 4. The different components of interface 110 are connected by lines indicating data paths, with the numerals on the lines indicating the bit width of each data path.

The fibre channel interface 110 is connected to an external fibre channel connection 107 as well as to an internal data bus 145. Data bus 145 is shown in FIG. 4 as a PCI bus 145, which is preferred, but other alternative technologies could be used and still be in accordance with the present invention. Also connected to data bus 145 is a CPU or processor 150, a system buffer 160, and a wide area network interface (such as ATM) 170.

The switching platform 100 operates so as to allow data to be received over the fibre channel interface 110 and to be stored in the system buffer 160 under the direction of the CPU 150. The data can then be manipulated by the CPU 150 to enable the data to be transmitted by the WAN interface 170 over link 101. Similarly, data received from a remote switching platform 100 over the WAN interface 170 can be stored in system buffer 160 and manipulated by CPU 150 to allow for transmission through fiber channel interface 110 over fiber channel connection 107. The basic techniques for the storage and translation of data by the CPU 150 so as to allow remote connection of digital devices of differing protocols exists in the prior art and does not form a part of the present invention. Rather, the present invention is directed to the creation of a CRC value for a complete sequence 30 of fibre channel data. The present invention is equally applicable whether the fibre channel data is communicated to a remote switching platform 100 over a wide area network 102, or whether the data is translated and communicated locally through a non-fibre-channel interface, such as a physical ESCON interface.

This invention is accomplished using an improved fibre channel interface 110. This interface consists of three main functional modules. The first module is a fibre channel controller chip 112. This chip 112 performs FC-1, FC-2 and some FC-4 level processing. It has a 64-bit 66 Mhz PCI bus interface, a memory port, and a fibre channel 10-bit interface. In the preferred embodiment, this chip 112 is the Tachyon XL2 fibre channel controller available from Hewlett Packard (Palo Alto, Calif.). The controller 112 is responsible for extracting the data payload 16 from the fibre channel formatted frames 10 received across external interface 114 and presenting such data to the PCI bus 145. In addition, the controller is responsible for taking data received from the PCI bus 145 and converting the data into fibre channel frames 10. This step includes the generation of a frame-level CRC value 22 based on the value of the data received from bus 145.

The second module is the fibre channel physical interface, which consists of the external interface 114 and a serial-deserializer (SERDES) chip 118. The external interface 114 handles the physical communication with the copper or optical fibre channel line 107. This is a pure serial interface. The SERDES chip 118 interfaces between the serial external interface 114 and the 10 bit wide interface of controller chip 112. In the preferred embodiment, the HP 2630 SERDES chip from Hewlett Packard is used to handle this serial to parallel conversion.

The third module is the CRC module 130. This module 130 "snoops" the data running between the first two modules by receiving data through its inbound or receive channel (RX port 131) and its outbound or transmit channel (TX port 132). The RX port 131 receives data that comes across the fibre channel connection 107 and SERDES chip 118. The TX port 132 receives data being transferred from the fiber channel controller 112 to the SERDES chip 118 for transmission across fibre channel connection 107.

The function of the CRC module 130 is to receive 8B/10B data over the RX port 131 or TX port 132, decode that data, and process the FC frame header 14 for each frame 10 of data. If the frame 10 is of the type for which a CRC value is desired, the CRC module 130 performs a CRC operation on the data payload 16 of the frame 10. If the sequence 30 containing that frame 10 is more than one frame in size, the intermediate CRC is stored in memory and retrieved when the next frame 10 in that sequence 30 arrives.

The intermediate CRC generated on a frame 10 of data is stored in dual ported SRAM 140. SRAM 140 is logically divided into a receive (RX) SRAM 142 and a transmit (TX) SRAM 144. Intermediate CRC calculations related to data received on RX port 131 are stored in RX SRAM 142, while intermediate CRC calculations related to TX port 132 data are stored in TX SRAM 144. The CPU 150 has access to RX SRAM 142 and TX SRAM 144 through the PCI Bus 145 and the fibre channel controller 112. In this way, CPU 150 can access the CRC values generated by CRC module 130 and stored in SRAM 140. CPU 150 also uses SRAM 140 to track status data and change configuration data related to CRC module 130.

The sequence-level CRC is generated on the RX port 131 in order to be appended to the end of the received sequence 30. This value will be verified when the data is leaving the switching platform domain 108, either by another fibre channel interface 110 or another network or channel interface in either the current switching platform 100 or a remote switching platform 100.

The sequence-level CRC is generated on the TX port 132 for the purpose of checking the generated CRC value against a CRC value that is appended to the end of the sequence 30. The value appended to the end of the sequence 30 that is received on TX port 132 could have been generated by a remote switching platform 100 having a similar fibre channel interface 110. Alternatively, the appended CRC value could have been generated by another channel or network interface in switching platform 100 and simply appended to the data stream as that data was entering the switching platform domain 108.

The CRC module 130 is ideally created on a customized field programmable gate array (FPGA) chip. In the preferred embodiment, the CRC module 130 was programmed into a FPGA device manufactured by XiLinx, Inc. (San Jose, Calif.).

4. CRC Module 130

Figure 5:
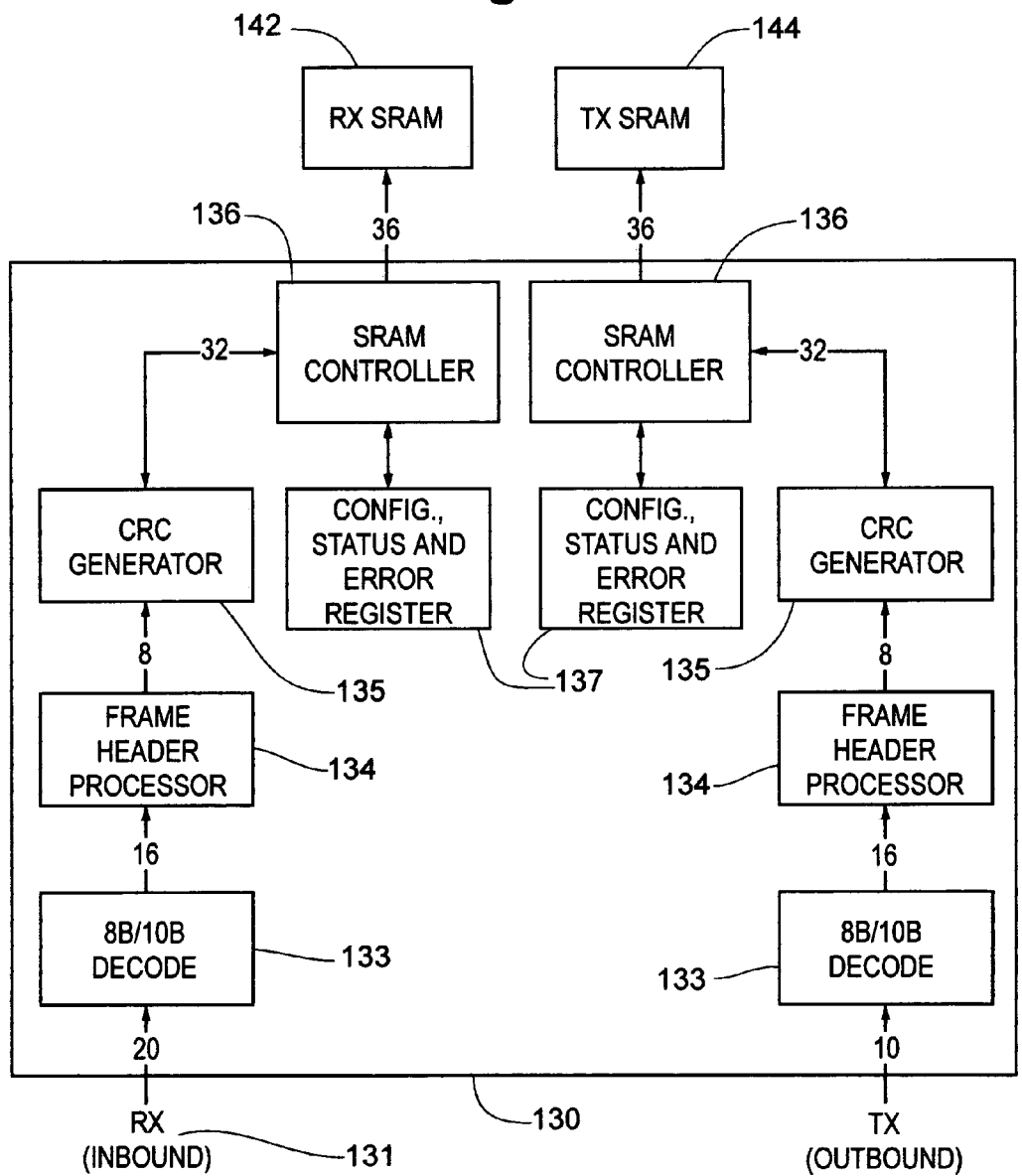
FIG. 5 is a block diagram showing the components of the CRC generator/checker.

FIG. 5 shows a block diagram of the CRC module 130, with the data paths and bit-widths of the data paths being shown between each element in the module 130. As can be seen in the Figure, data entering through RX port 131 and TX port 132 are handled similarly, with data from both ports 131, 132 passing through the four major components of the CRC module 130. These four components, namely the 8B/10B decoders 133, fibre channel frame header processor 134, 32-bit CRC generator 135, and a SRAM controller 136, are described in more detail below. In addition to these components 133-136, the CRC module also contains registers 137, which are used to store configuration, status, and error information.

a) 8B/10B Decoder 133

Figure 6:
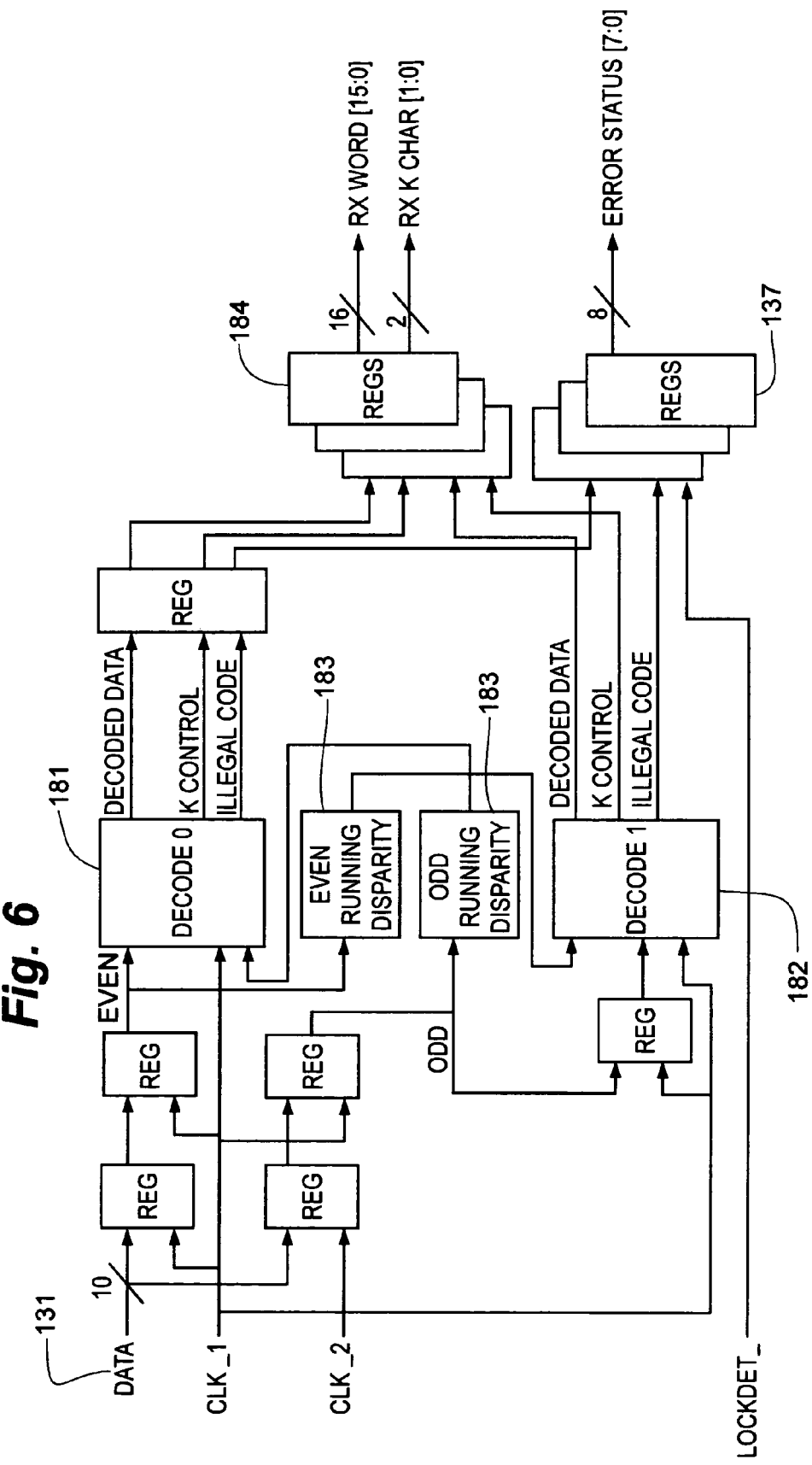
FIG. 6 is a block diagram showing the components of the inbound CRC generator.

The 8B/10B decoder 133 serves to convert the 8B/10B incoming data stream into a two 8-bit data bytes for processing by the frame header processor, as shown in more detail in FIG. 6 for RX port 131. The data coming across RX port 131 is 10 bits wide with dual 53 Mhz clocks. This is split in two and run through two parallel 8B/10B decoders 181 and 182 (one for odd bytes and one for even bytes). The output of the decoders 181, 182 is then combined in registers 184 into a two-byte wide (16-bit) data bus made available to frame header processors 134. The disparity modules 183 check for running disparity errors.

Decoders 181 and 182 will perform frame-level error checking and will flag illegal characters, running disparity errors, and other known types of errors. These errors and control signals (i.e., K characters) will be provided to registers 137. Any 8B/10B decode errors flagged by these decoders 181, 182 should also be detected in the error registers of the fibre channel controller 112.

Figure 7:
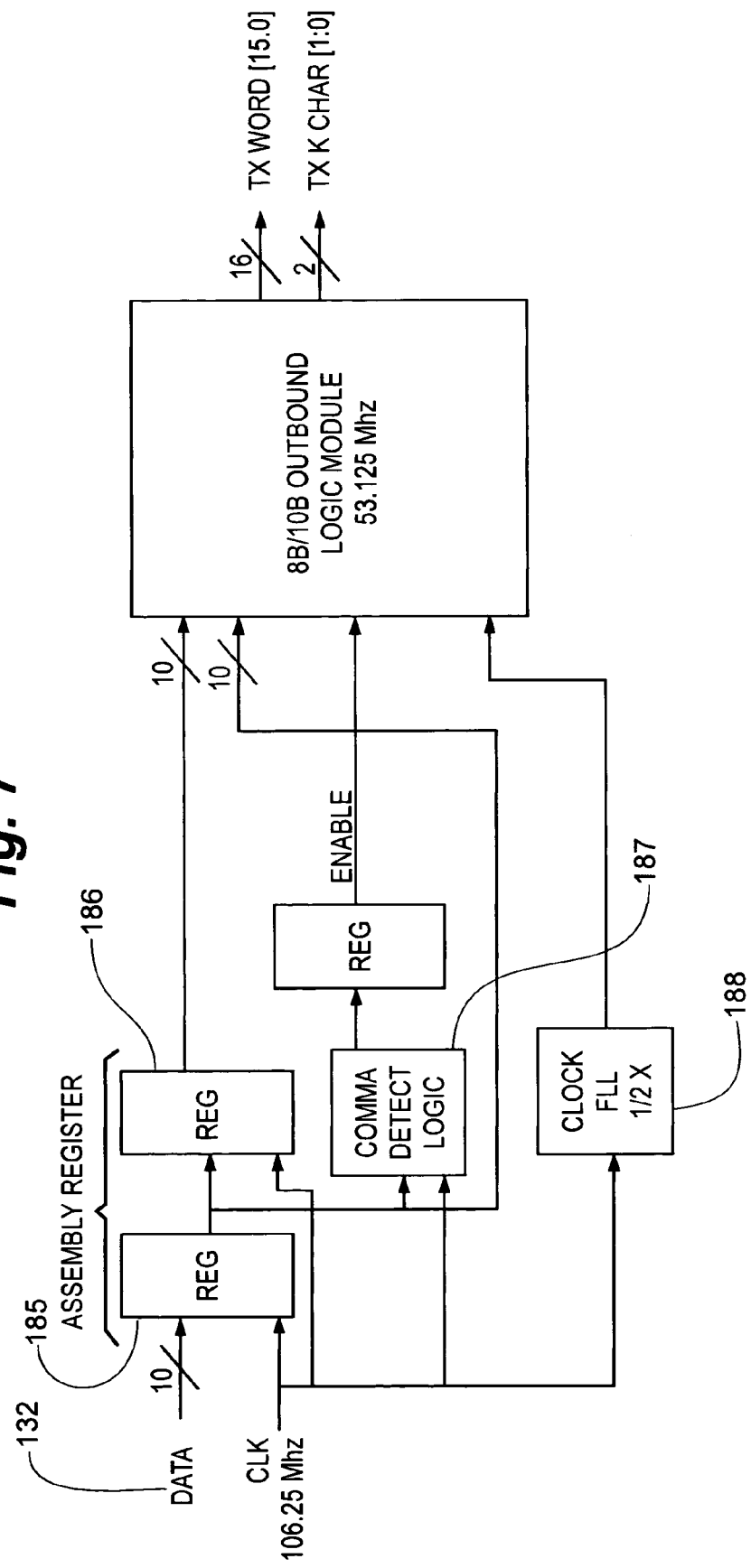
FIG. 7 is a block diagram showing the components of the outbound CRC generator.

The 8B/10B decoder 133 for the outbound path is shown in FIG. 7. Data received from TX port 132 is 10 bits wide, and is received at a clock speed of approximately 106 MHz (twice that of the RX port). This data is stored sequentially in two 10-bit assembly registers 185, 186, with odd bytes stored in the first register 185 and even bytes stored in the second register 186. The incoming data is searched for an 8B/10B comma character (K character) by comma detect logic 187. The comma character is always put in the even register 186.

The output of the partial outbound 8B/10B decoder shown in FIG. 7 should match the data characteristics received on RX port 131. This then allows the use of the logic used on RX port 131 (seen in FIG. 6) to complete the 8B/10B decoding of data received on TX port 132. To match the clock speed of RX port 131, a circuit 188 is used to divide the TX clock speed in half. The comma detect logic is then used to enable the circuitry of FIG. 6. Although it is unnecessary to do frame error checking on the outbound channel, since the output of the fibre channel controller 112 is monitored directly and controller 112 will have already checked from frame errors, such error checking will be accomplished to the extent the exact logic of FIG. 6 is used to complete the decoding of data received on TX port 132.

b) Frame Header Processor 134

The frame header processor 134 receives raw data from the 8B/10B decode module 133 two bytes at a time. By analyzing this data, the frame header processor 134 identifies the various elements shown in FIG. 1 for each frame 10 decoded by module 133. Once the frame 10 is identified in this matter, it is a simple matter to determine the following data about the frame 10:

the protocol used for data as defined by FC-4 (i.e., SCSI or HIPPI),
the start of a sequence,
the end of a sequence,
the originator and response exchange identifiers,
the user data payload within a frame,
the start of frame,
the fill data bytes, and
the end of frame.

Using this information, the frame header processor 134 provides the CRC generator 135 with the data necessary to perform a sequence-level CRC calculation. Specifically, processor 134 provides the generator 135 with the payload data 16 from each frame, as well as control signals that indicate:

when to start CRC generation,
when to end CRC generation, and
when the first frame in a sequence is being presented.

The payload data 16 is passed to CRC generator 135 one byte at a time, including any optional header 18 that is included in the data payload 16. Before passing the data payload 16 on, the processor 134 will examine the data for fill bytes. Fill bytes are used in each data payload 16 that is not a modulo four byte size. As a result, there will always be between zero and three fill bytes in each data payload 16. Since these fill bytes would affect the sequence-level CRC calculation, the fill bytes are discarded by the frame header processor 134 before they reach the CRC generator 135.

Fibre channel protocols can be used to carry multiple types of data, as defined in level FC-4. In one embodiment of the present invention, a sequence-level CRC is calculated only for SCSI data sequences (FCP-SCSI). To accomplish this, the frame header processor 134 simply does not pass any data through that does not come from frames 10 having a header 14 that indicates that the frame 10 contains SCSI data. In other embodiments, the invention creates a sequence-level CRC for all types of data passing through the fibre channel interface 110.

c) CRC Generator 135 & 138

The CRC generator 135 receives payload data 16 from frame header processor 134 and generates a 32-bit CRC based upon this data. The algorithm used to generate the CRC value is the same that is used for CRC in fibre channel frames 10, as defined by FC-PH Annex N. Using this algorithm, error detection probability is guaranteed for sequence sizes up to 430 Mbytes.

The CRC generator 135 calculates a 32 bit CRC on a byte-by-byte basis using the following polynomial:

$$x^{}32+x^{}26+x^{}23+x^{}22+x^{}16+x^{}12+x^{}11+x^{}10+x^{}8+x^{}7+x^{}5+x^{}4+x^{**}2$$

On the beginning of a new sequence, the current CRC value is reset to all ones. As each new byte is received from the frame header processor 134, the CRC value for this additional new byte is calculated by starting with the CRC value calculated for all prior bytes from the current sequence 30.

There is no requirement that all frames 10 in a sequence 30 be received together. In fact, it is expected that inbound and outbound fibre channel frames 10 from a single sequence 30 will be may be interleaved with frames 10 from numerous other exchanges 40. When a frame 10 is completed, and the sequence 30 is not yet complete, the CRC generator 135 stores the current, intermediate CRC result in dual ported SRAM 140 through the SRAM controller 136. These intermediate results are stored in queues indexed according to the fibre channel exchange ID number that was assigned by fibre channel interface 110. When a new frame 10 arrives that is not the first frame 10 in a sequence, the intermediate CRC result is retrieve from SRAM 140 and is used as the starting CRC value. This allows the CRC calculation to continue in parallel across many interleaved sequences 30.

Errors, completion status, and other information that must be communicated to later frames 10 or to the CPU 150 are also stored in SRAM 140. For instance, out-of-order frames (OOO) within a fibre channel sequence 30 are not allowed since they will cause an incorrect CRC calculation. As a result, CRC generator 135 will create an OOO error and store this information in registers 137. The registers 137 can then communicate this information to SRAM 140. The storage queues and the register storage is described in more detail below.

The inbound and outbound CRC generators 135 are quite similar. Each generator 135 creates a CRC value one byte at a time, storing intermediate and final CRC values in the dual ported SRAM 140. Status and error information relating to the CRC calculations are also stored in SRAM 140, with such information being written to SRAM 140 whenever the CRC value is written.

The inbound generator simply stores the final CRC value in RX SRAM 142. Once stored in RX SRAM 142, CPU 150 will append this final CRC value to the end of the data found in sequence 30. This value will be compared with a newly generated CRC value when the data is leaving the switching platform domain 108. If desired to make later comparisons easier, the calculated receive CRC value can be inverted before being appended to the end of sequence 30.

The outbound generator also calculates the CRC value and stores this value in SRAM 140, specifically TX SRAM 144. The purpose for this generation is to create a CRC value that can be compared to the expected CRC value that is appended to the end of the last data payload 16. In the preferred embodiment, this is accomplished by storing the value in the TX SRAM 144, and allowing the CPU 150 to compare this calculated value to the appended expected value.

There are two possible techniques that can be used by the CPU 150 to accomplish this comparison. First, and preferably, the expected CRC value (created by a remote CRC generator) is stored in a way that is accessible to CPU 150. When the CRC generator 135 then creates the calculated value, a status bit in SRAM 144 indicates to CPU 150 that the calculated CRC value is complete. CPU 150 then simply compares this calculated value to the stored expected value, and generates a CRC error if the values do not match.

To use this technique, it is of course necessary for the expected CRC value found at the end of the data sequence 30 to be identified and placed in the queue in TX SRAM 144. CPU 150 accomplishes this task as the sequence 30 is being transmitted across PCI bus 145 to the fibre channel interface 110. In order for the calculated CRC value to match the queued expected value, the expected value must be removed from the final data payload 16 so that it does not pollute the calculated CRC value. This expected value must also be removed to prevent the appended CRC value from leaving the switching platform domain 108 and being treated as actual data by other devices. Thus, CPU 150 is responsible for identifying the expected CRC value on a data sequence 30, saving this value to TX SRAM 144, and removing this value from the sequence 30 before it is received by fibre channel interface 110.

The second technique is to simply compute the sequence-level CRC value over the entire data of the sequence 30, including the 32 bits of expected CRC value appended to the end of the sequence 30. As is well known with CRC techniques, if the original CRC is including in the CRC calculation, the resultant CRC can be compared to a constant value to determine whether there were any errors in transmission. If there is a match, then there were no transmission errors. If any other value is returned from the CRC calculation, an error has been detected. Of course, if this technique were used in the present invention it would be necessary to include additional circuitry in fibre channel interface 110 to extract the expected CRC value before it leaves the switching platform domain 108.

In the preferred embodiment, the actual comparison of the expected and calculated CRC values is carried out by CPU 150. It would be well within the scope of the present invention to incorporated CRC compare circuitry direction in the CRC module 130. This circuitry would be responsible for performing the actual comparison between the final calculated CRC value and the expected CRC value, which could be stored in TX SRAM 144 by CPU 150. Once the comparison was accomplished, the results could be stored in status registers in TX SRAM 144, thereby giving CPU 150 notice of CRC errors.

Inbound and outbound CRC operations are performed simultaneously and independently in the preferred embodiment. Thus, although the logic of the CRC generator is nearly identical, separate components in the FPGA chip can be used to increase independence and throughput through RX port 131 and TX port 132. Obviously, it would be well within the contemplated scope of the present invention to take advantage of the parallel nature of this logic and utilize the some or all of the same circuitry for both the RX port 131 and the TX port 132.

d) SRAM Controller 136 and Status Registers 137

Configuration, status and error information is stored on the fibre channel interface 110 on registers 137. The other modules 133, 134, 135, and 136 of fibre channel interface 110 can access these registers in order to obtain configuration information or to update, verify, or reset status and error results.

The SRAM controllers 136 provide an interface between the SRAM 140 and the modules 133-135 and registers 137 on interface 110. This controller 136 takes the results from the CRC generators 135 and writes the 32-bit result to SRAM 140. Even parity is generated and checked on each byte of data transferred between SRAM 140 and SRAM controller 136. This SRAM controller 136 also contains the registers and logic to run the queue structures located on SRAM 140, which are described in more detail below. CRC generators 135 request data from the SRAM 140 by signaling the SRAM controller 136 through an interrupt.

5. SRAM 140

The SRAM 140 has dual memory cells that allow simultaneous access to the same memory location. Consequently, the SRAM 140 is considered dual ported, with access to the SRAM 140 provided simultaneously to the SRAM controller 136 in the CRC module 130 as well as CPU 150 through the fibre channel controller 112. The SRAM 140 has separate clocks, address and data paths for each port. SRAM 140 has a size of 2×32K×36 and is synchronous memory.

Figure 8:
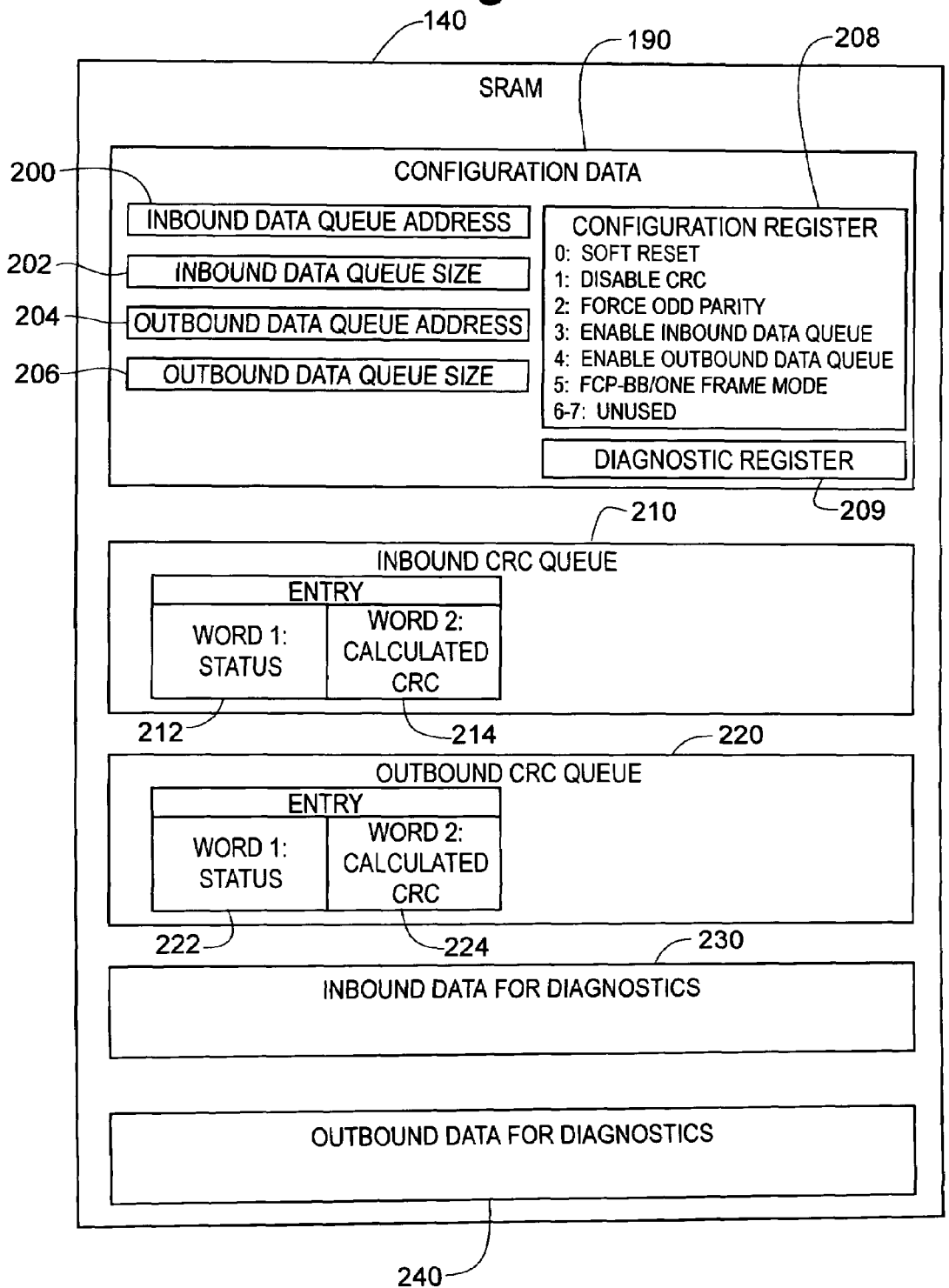
FIG. 8 is a block diagram showing the contents of the SRAM.

The contents of SRAM 140 are shown in FIG. 8. As shown in this Figure, SRAM 140 contains configuration data 190, inbound and outbound CRC queues 210, 220, and inbound and outbound data queues 230, 240 (both used for diagnostics). FIG. 8 does not shown SRAM 140 divided between RX SRAM 142 and TX SRAM 144. This is to show that the two components 142, 144 of SRAM 140 can coexist within a single physical SRAM location 140. Of course, it would be a simple matter to physically separate the two SRAM components 142, 144 into two physically distinct memories.

a) Configuration Data 190

The configuration data 190 can be set by CPU 150 in order to configure and control the CRC module 130. The first elements of configuration data 190 are the inbound data queue address 200 and size 202, which define the location and size of inbound data queue 230. Similarly, outbound data queue address 204 and size 206 define outbound data queue 240.

Configuration data also contains configuration register 208, which is used to configure various elements of CRC module 130. When signaled by an interrupt from CPU 150, module 137 will read the value of configuration register 208 and store it in the configuration register that forms part of module 137.

If bit 0 of the configuration register 208 is set, a soft reset is performed. On soft reset, the CRC module 130 obtains queue configuration data from area 190 of SRAM 140. SRAM controller 136 will use this data to set up its internal registers to allow access to the queues 210, 220, 230, and 240.

Bit 1 of the configuration register 208 is used to enable and disable CRC checking on fibre channel interface 110. Bit 2 of register 208 is used to force SRAM 140 from its normal even parity to odd parity. Bits 3 and 4 enable the use of inbound data queue 230 and outbound data queue 240, respectively. Bit 5 determines whether or not the CRC module 130 is operating in normal mode or frame-level CRC mode. The frame-level CRC mode is a special mode, which indicates that incoming data is not formatted into multi-frame sequences 30, but rather formatted into single frames 10. This mode is used in FC-BB, FC-BB2, and FCIP communications, and is described in more detail below. Bits 6 and 7 in configuration register 208 are unused in the preferred embodiment.

b) Queue Indexing

Each of the queues 210, 220, 230, and 240 has a single entry for each sequence 30 being checked by CRC module 130. The size of each queue 210, 220, 230, and 240 is limited by the size of the SRAM 140. Inbound data queue size 202 and outbound data queue size 206 are used to allow CPU 150 to control the size of diagnostic queues 230, 240 during operation. It is of course possible to use a single entry in configuration data 190 to control the size of both diagnostic queues 230, 240 with a single value. Each entry in the SRAM queues 210, 220, 230, and 240 is randomly accessible by module 130 and CPU 150 using a queue index.

The queue index used in the present invention is one of the exchange IDs for the sequence 30. As explained above, an FCP-SCSI exchange 40 consists of one or more fibre channel frames 10 divided into sequences 30. If the controller 112 is initiating an exchange 40 with another fibre channel node, the controller is considered the originator. If the controller 112 is responding to an exchange initiated by another device, the controller 112 is considered the responder. Each new fibre channel exchange 40 is assigned a unique identifier by both the originator (known as the originator ID) and the responder (known as the responder ID). These IDs are stored in the header 14 of each frame 10.

The fibre channel interface 110 is always responsible for assigning one of these exchange IDs. Using this responsibility, the fibre channel interface 110 can ensure that its exchange ID is always a number between 0 and one less than the total number of sequences that CRC module 130 can track. Thus, if the queues 210, 220, 230, 240 were 256 entries in size, the highest allowable exchange ID would be 256–1, or 255. The exchange ID set by interface 110 is then used as the index to queues 210, 220, 230, and 240. Specifically, the originator ID is used as the index where the controller 112 is the originator, and the responder ID is used where the controller 112 is the responder.

Note that the method of using an exchange ID as the index to queues 210, 220, 230, and 240 is sufficient to uniquely identify a sequence 30 because, under the fibre channel protocol, only a single sequence within an exchange can be active at a single time. If multiple sequences 30 from a single exchange 40 could coexist, it would not be possible to use the exchange ID to uniquely identify the sequence 30 in queues 210, 220, 230, or 240 unless only a single sequence 30 per exchange were analyzed.

c) Inbound CRC Queue 210

The inbound CRC queue 210 is designed to store the status and CRC value of each sequence 30 being received by CRC module 130 across the RX port 131. There are two thirty-two bit words in each entry in inbound CRC queue 210, namely the status word 212 and the calculated CRC word 214.

The status word 212 contains a done flag bit that informs the processor 150 that the last frame 10 of the sequence 30 has been analyzed and that CRC word 214 contains the sequence-level CRC. One flag in status word 212 indicates that CRC checking is enabled. The status word 212 also contains an error bit, and bits that determine whether the error relates to an illegal character, a running disparity error, a clock lock, a parity error, or an out of order frame error. The remainder of the status word 212 comprises a bit that identifies whether the fibre channel interface 110 is the originator or responder, and also the sixteen bit exchange ID used for this sequence 30.

The calculated CRC word 214 is the location where inbound CRC generator 135 stores its CRC calculations after analyzing a complete frame 10 of data. The calculation is an intermediate calculation if the last frame 10 analyzed was not the final frame 10 in the sequence 30. Intermediate calculations are stored in word 214 so that the value can be retrieve conveniently when the next frame 10 in that sequence 30 is retrieved. The final CRC calculation is the result from inbound CRC generator 135 after the final frame 10 in a sequence is analyzed. This value is stored in CRC word 214 to allow processor 150 the ability to append the final calculated value onto the end of the sequence 30.

d) Outbound CRC Queue 220

The outbound CRC queue 220 contains information relating to the data received by CRC module 130 across TX port 132. Like the inbound CRC queue 210, each entry in the outbound CRC queue 220 contains two words: the status word 222 and the calculated CRC word 224.

As was the case with the inbound status word 212, outbound status word 222 contains a bit that indicates that CRC processing is complete for a sequence 30. The status word 222 in outbound CRC queue 220 also indicates whether interface 110 was the originator or responder for the current sequence, and contains the exchange ID used for the current sequence 30. Finally, the status word 222 contains information about any errors encountered, specifically status bits that indicate the presence of an error and type of error encountered. The only defined error type for outbound processing is a parity error.

The calculated CRC word 224 for outbound queue 220 is used the same as the CRC word 214 in inbound queue 210, namely to contain the intermediate and final CRC values.

Processor 150 uses this word 224 to do the CRC comparison with the expected CRC value that was extracted from the end of the current sequence 30.

As mentioned above, it is possible to do the actual comparison of CRC values in the CRC module 130. To do this, it would be necessary for the CPU 150 to place the expected CRC value in the outbound queue 220. This extra word in each entry would mean that entries in outbound CRC queue 220 would have to be three words long. CRC module 130 could then retrieve this expected value from queue 220 whenever the expected value was needed for a CRC comparison. In addition, if the CRC module 130 were to do the CRC comparisons, the status word 222 would have to be altered to indicate the results of the CRC comparisons. CPU 150 could then simply check the status word 222 to determine the result of the comparison.

e) Diagnostics

It is sometimes useful to track the data being analyzed by CRC module 130 for diagnostic purposes, such as during the development of a fibre channel interface 110, a new wide area network interface 170, or even a new version of the switching platform 100 itself. The inbound data queue 230 and the outbound data queue 240 are used for this purpose. When activated, these queues 230, 240 store all of the data that the CRC module 130 has analyzed to generate a sequence-level CRC. If an error indication is received from CRC module 130, processor 150 may compare the data in these queues 230, 240 with the data in system buffer memory 160 in order to determine where an error might have occurred.

The processor 150 enables this feature by setting bits 3 and/or 4 of configuration register 208. This feature is intended to be used for sequences 30 having only a small number of frames 10. Otherwise, the queues 230, 240 would quickly grow and overwhelm their limited space in SRAM 140.

6. Methods for Calculating a Sequence-Level CRC 250, 300

Figure 9:
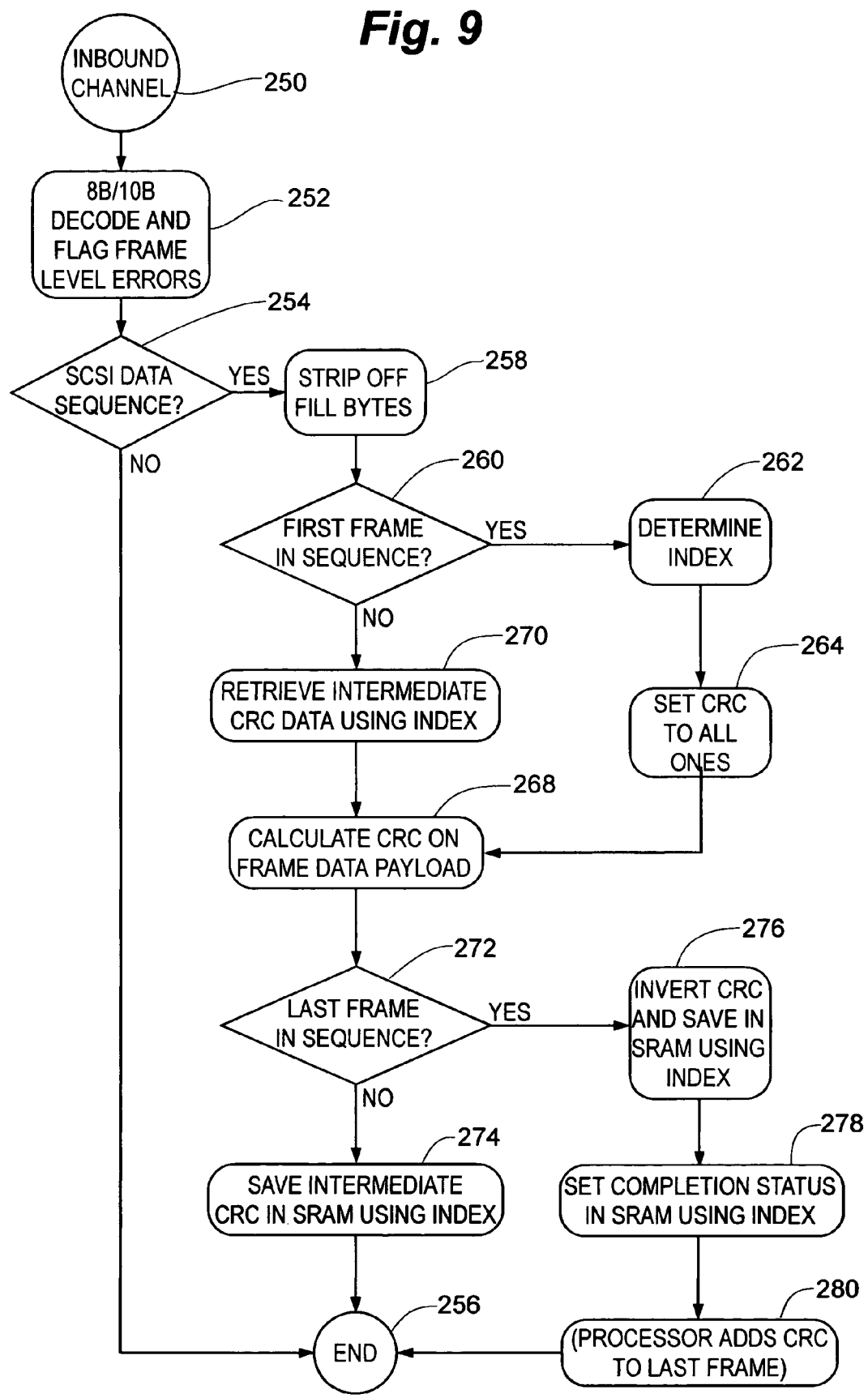
FIG. 9 is a flow chart showing a method for creating a sequence-level CRC on inbound data.
Figure 10:
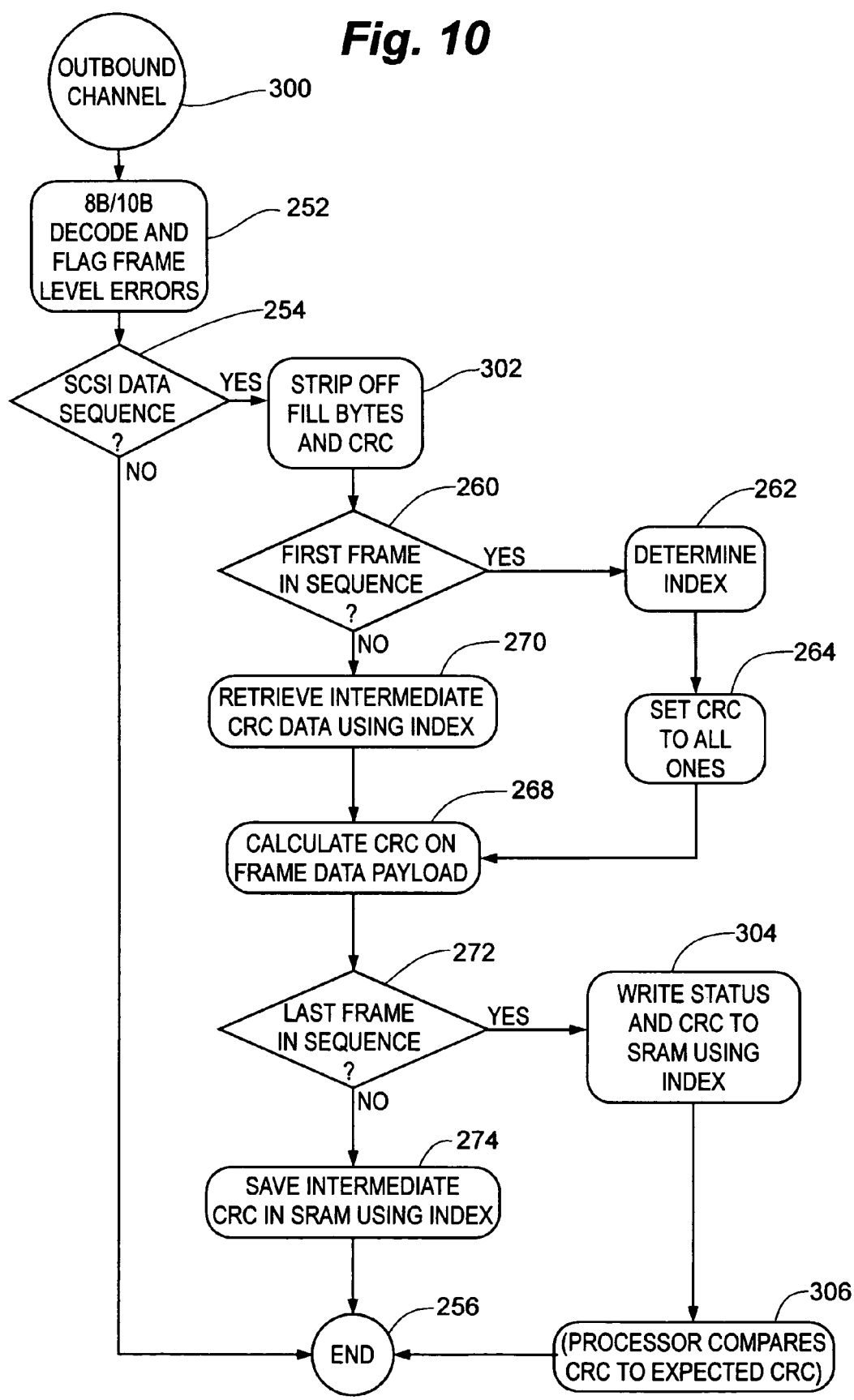
FIG. 10 is a flow chart showing a method for creating a sequence-level CRC on outbound data.

In addition to the above-described apparatus for calculating a sequence-level CRC, the present invention also includes methods for calculating sequence-level CRCs for fibre channel communications. FIG. 9 shows a method for calculating such a CRC value on incoming data, while FIG. 10 shows a method for outgoing data.

Turning first to FIG. 9, a method 250 is shown for calculating a fibre channel sequence-level CRC for data received on inbound channel 131. The first step 252 in the method is to decode the incoming data using 8B/10B decoding. Once this is accomplished, the header 14 can be examined in step 254 to determine if the current frame 10 contains SCSI data in its data payload 16. If not, the frame is ignored and the method ends at step 256. Of course, this step 254 can be ignored or altered to the extent that data other that SCSI data is to be analyzed.

If the frame 10 does contain SCSI data, then step 258 strips of any fill bytes found in the data payload 16. Once this is accomplished, the header 14 is examined to determine if the current frame 10 is the first frame 10 in the current sequence 30. If step 260 determines that it is, it is then necessary to determine what index value will be used to store and retrieve information about this frame 10 in step 262. In the preferred embodiment, this index value is the same as the exchange identifier that is assigned by the local fibre channel interface 110. Since this value is necessary for communications between fibre channel controllers 112, it may well have been selected at a time before the header 14 is examined in steps 254 and 260. Step 262 exists at this location in FIG. 9 merely to show that the index value must be selected and known before other processing can be accomplished.

To initiate CRC calculations, the CRC value must be reset to all ones (all F's), which occurs at step 264. At this point, the entire data payload 16 is used to create a CRC value for that payload (step 268).

If step 260 determines that the current frame 10 is not the first frame 10 in the current sequence 30, then the previously calculated CRC value for this frame must be retrieved in step 270. This value is retrieved using the index determined at step 262. Once this intermediate CRC value is retrieved, it is used as the starting point for creating a CRC for the data payload of the current frame in step 268.

It is now necessary to examine the header 14 and determine whether the current frame 10 is the last frame 10 in its sequence. If step 272 determines that it is not, the CRC value determined in step 268 is saved in step 274 using the index value. This intermediate CRC value is saved so that it can be retrieved when needed to do further CRC calculations on additional frames 10 for the current sequence 30. Once this value is saved, the procedure 250 ends at step 256.

If step 272 determines that the current frame 10 is the last frame 10 of its sequence, then the CRC calculated in step 268 is known to be the complete, calculated sequence-level CRC value. This value is inverted and saved in SRAM 140 in step 276. The CRC module 130 then indicates to CPU 150 that the sequence-level CRC calculation is complete by setting a status bit (step 278). The CPU then appends the saved sequence-level CRC to the end of the current sequence 30 in step 280, and processing terminates in step 256.

The process 300 for computing a sequence-level CRC on outbound channel 132 is shown in FIG. 10. This process 300 is similar to the process 250 used on inbound channel 131. To highlight this similarity, identical reference numerals are used across FIGS. 9 and 10 for steps that function substantially in the same manner. The primary differences between process 300 and process 250 are then seen to relate to steps 302, 304, and 306. The similarities relate to the 8B/10B decoding and error checking of step 252, the SCSI data frame check of step 254, the CRC calculation of steps 260-270, and the saving of the intermediate CRC value in steps 272-274.

Step 302 replaces step 258. Instead of simply stripping off the fill bytes, as in step 258, it is also necessary to ensure that the expected sequence-level CRC value found in the last frame 10 of the sequence 30 is also stripped off. As explained above, this is necessary to avoid corruption of the calculated sequence-level CRC in process 300. In the preferred apparatus embodiment described above, this is accomplished by CPU 150 before the data is transmitted to the interface 110.

Likewise, steps 304-306 replace steps 276-280 from process 250. When step 272 determines that the last frame 10 in a sequence has been reached, process 300 requires that the CRC result should be shared with CPU 150 so that a comparison with the expected value can be performed. The sharing is done is step 304 by writing the calculated value and completion status to outbound CRC queue 220. The processor 150 then takes the final CRC value and compares it with the expected CRC value in step 306. Once this is done, process 300 terminates at step 256.

7. Frame-Level CRC Mode

Figure 11:
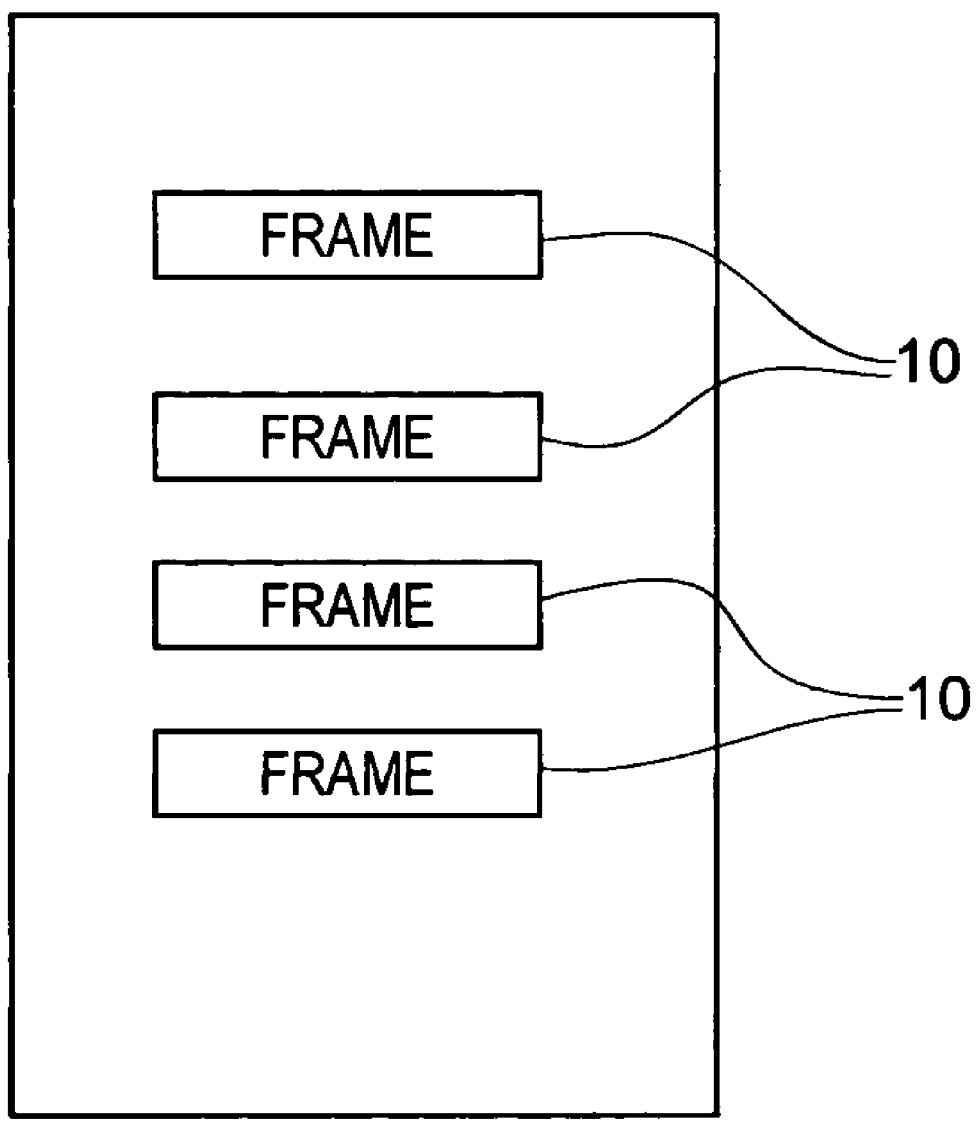
FIG. 11 is a block diagram showing the communication in single frame fibre channel communications such as FCIP.

As described above, the present invention is capable of operating in a mode in which only a single frame 10 is communicated outside of the exchanges 40 and sequences 30 shown in FIG. 2, as is shown in FIG. 11. Various fibre channel protocols require type of communication, including the FC-BB, FC-BB-2, and FCIP protocols. In these circumstances, it is not necessary to calculate a sequence-level CRC value, since each frame contains its own CRC value 22, as shown in FIG. 1. Thus, upon a frame 10 entering the switching platform domain 108, this CRC value 22 is extracted directly from the frame 10 and placed in the SRAM 140 to allow access by the CPU 150.

This section sets forth the implementation details of this frame-level CRC mode, including a second embodiment of the present invention that maintains compliance with the fibre channel protocols that require that frame-level CRC values not be modified. Specifically, this second embodiment ensures that the frame-level CRC value 22 that came into the switching platform domain 108 is the same frame-level CRC value 22 that is used when leaving the switching platform domain 108. If this second embodiment were not utilized, the data stream leaving the switching platform domain 108 would contain a frame 10 generated by the fibre channel controller 112 as the data is leaving the domain 108. However, if the data within the frame 10 were corrupted or otherwise altered within the switching platform domain 108, the target device would not detect this corruption because the controller 112 would generate a new frame-level CRC value 22 on the corrupted data. Thus, in order to be compliant with the protocols for FC-BB, FC-BB-2, and FCIP, it is necessary to restore the original frame-level CRC value 22 before the frame 10 leaves the domain 108.

Figure 12:
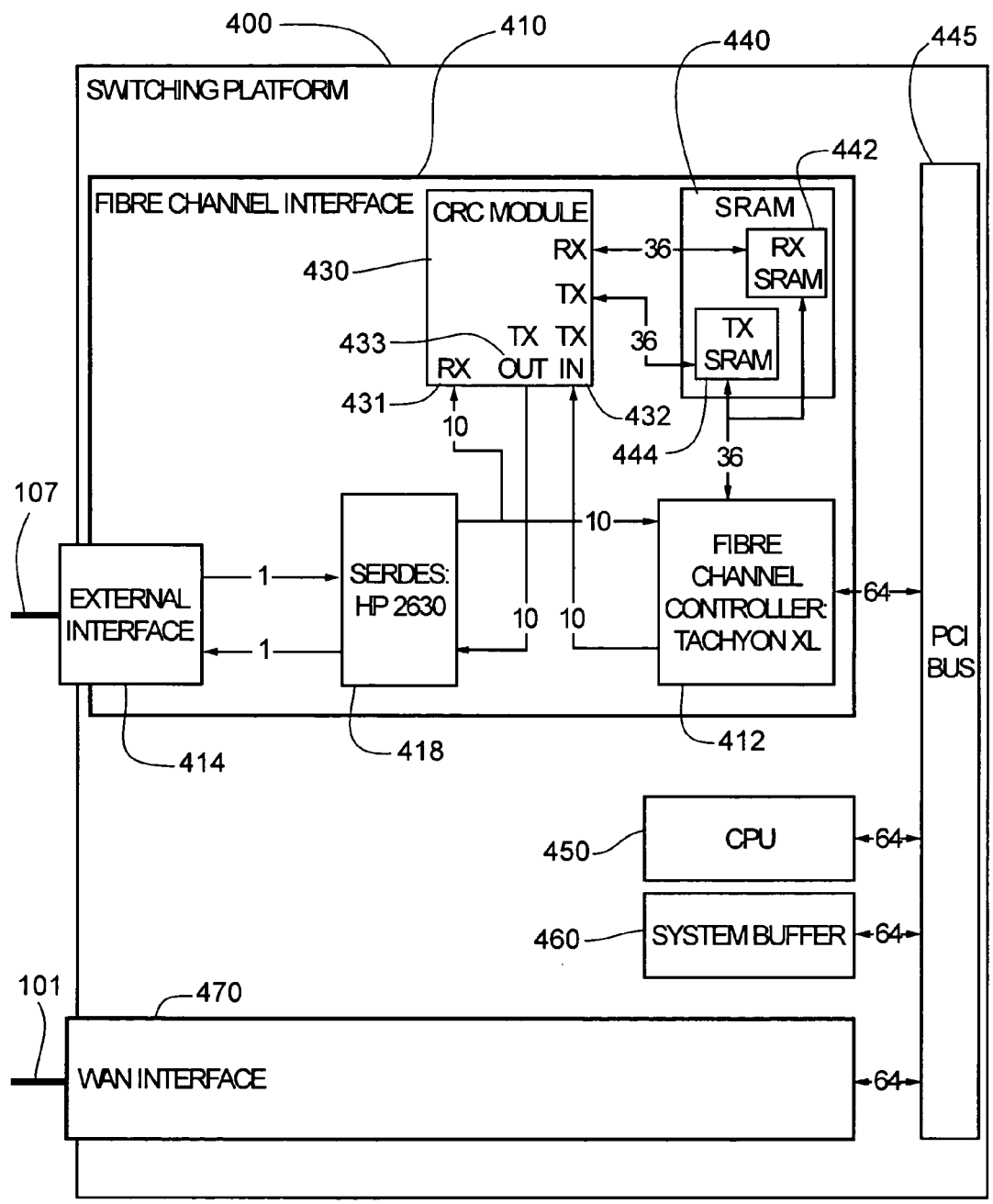
FIG. 12 is a block diagram of a second embodiment of the present invention in the context of a switching platform domain.

FIG. 12 shows a switching platform 400 containing a modified fibre channel interface 410, as well as a CPU 450, a system buffer 460, and a WAN or other network interface 470. The main components of this modified fibre channel interface 410 are the fibre channel controller 412, the external interface 414, the SERDES chip 418, the CRC module 430, and the SRAM 440. Only the CRC module 430 and the interconnection between the components are significantly modified between the first embodiment of FIG. 4 and this second embodiment.

The data flow between FIGS. 4 and 12 are nearly identical, with the one exception being the 10B data leaving the Fibre Channel controller 112, 412. In FIG. 4, this data is fed directly into the SERDES chip 118 with the CRC module 130 simply monitoring the data. In the second embodiment, the data leaving the Fibre Channel Controller 412 is fed directly into TX In port 432 of CRC module 430. The data then leaves the CRC module 430 through the TX out port 433 and is submitted to the SERDES chip 418. This allows the CRC module 430 to replace the frame-level CRC value 12 generated by Fibre Channel Controller 412 with the original frame-level CRC value 12 found in the SRAM 440, as is described in further detail below.

Figure 13:
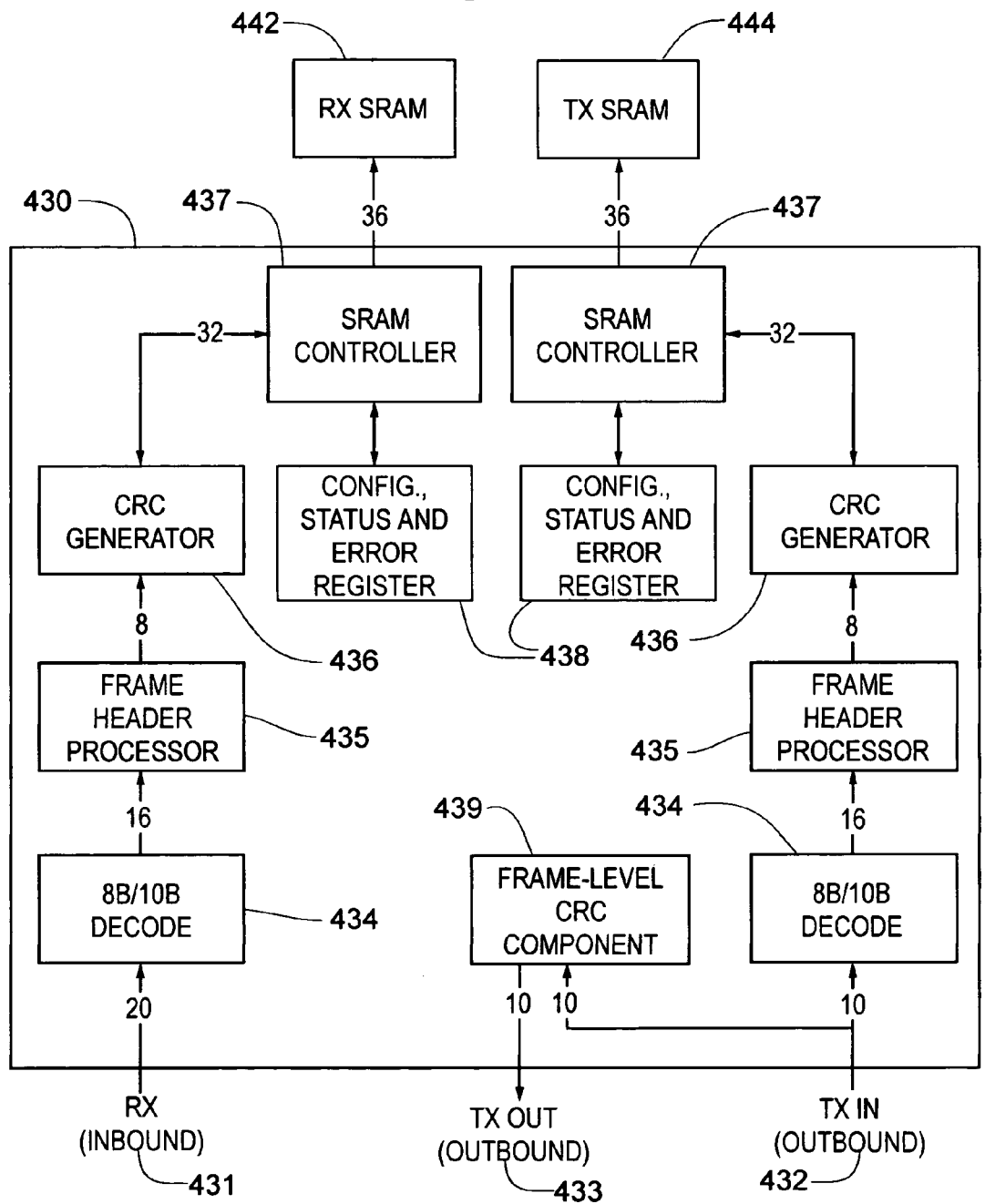
FIG. 13 is a block diagram showing the components of a second embodiment CRC generator.

FIG. 13 shows the details of CRC module 430, which is very similar to the CRC module 130 in the first disclosed embodiment. Both modules 130, 430 have RX ports 131, 431; 8B/10B decode components 133, 434; frame header processor components 134, 435; CRC generators 135, 436; SRAM controllers 136, 437, and registers 137, 438. When operating in a mode other than frame-level CRC, both modules 130, 430 decode data received on RX port 131, 431 and extract the data payload 16 from each frame 10 using the frame header processor 134, 435. Similarly, both present the data payload 16 to the CRC generator to generate a sequence-level CRC value, which is then stored in RX SRAM 142, 442 using SRAM controller 136, 437. Similarly, both modules 130, 430 monitor data leaving the switching platform domain 108 through TX port 132 or TX In port 432. This data is then decoded, the data payload 16 is extracted, and a CRC value is generated and placed in TX SRAM 144, 444. When processing multi-frame sequences 30, this allows the CPU to determine whether the sequence 30 has been corrupted within the switching platform domain 108.

The second embodiment of CRC module 430 differs from module 130 shown in FIG. 5 in the existence of TX Out port 433 and frame-level CRC component 439. In any mode other than one-frame-per-second mode, these elements 433, 439 simply act to complete the circuit allowing the fibre channel controller 412 to send data to the SERDES chip 418. However these elements play a crucial role in the functioning of the second embodiment 430 in the frame-level CRC mode.

In this mode, frames 10 are received by the switching platform 400 over fibre channel line 107. The external interface 414 receives this information in serial format and presents the data to SERDES 418 for conversion to 10 bit words. The words are then presented to the fibre channel controller 412, who is responsible for extracting the data from the frames 10 and performing other FC-1, FC-2, and FC-4 level processing. The data path from the SERDES 418 to the controller 412 is monitored by CRC module 430 through RX port 431. The frames 10 received over this port 431 are decoded by 8B/10B decoder component 434 and divided into frame elements by frame header processor 435. However, instead of transmitting the data payload 16 to the CRC generator 436 for the development of a sequence-level CRC value, the frame header processor 435 simply submits the frame-level CRC value 22 to the SRAM controller for submission to the RX SRAM 442. The CPU 450 can then access this value and append it to the data payload being transmitted through the switching platform domain 108.

After the data has been transmitted over WAN 102, it then enters another switching platform 400 for retransmission over a fibre channel line 107. The data is received over WAN interface 470, and stored in system buffer 460. The data is then taken from system buffer 460 and presented to the fibre channel interface 410 by CPU 450 over the local bus 445. The CPU 450 is responsible for stripping the appended, original frame-level CRC value 22 and placing the value in TX SRAM 444, with the actual data comprising the data payload 16 being presented to the fibre channel controller 412 for conversion to fibre channel frames 10. The controller 412 then submits the recreated frames 10 to the CRC module 430 via TX In port 432.

CRC Module 430 generally allows the data it receives on TX In port 432 to leave via TX out port 433, which then leaves the fibre channel interface 410 across fibre channel connection 107. However, the module 430 must be able to replace the frame-level CRC value 22 generated by the fibre channel controller 412 with the CRC value 22 that the CPU placed in TX SRAM 444. To do this, module 430 stores the data coming in on TX In port 432 temporarily in a FIFO buffer before allow the data to exit on TX out port 433. When the module 430 recognizes that the CRC value 22 is in its buffer, it simply replaces the value in the buffer with a value it received from TX SRAM 444.

These tasks are performed by the elements of CRC module 430 that are shown in FIG. 13. The frame-level CRC component 439 contains the buffer, and allows data received on TX in port 432 to exit on TX out 433 after a short stay in its buffer. The 8B/10B decode component 434 and the frame header processor 435 work together to recognize when the CRC value 22 is within the buffer of frame-level CRC component 439. This is accomplished by monitoring the data stream entering through TX in port 432. When the frame header processor 435 determines that a new frame is being received, the stored CRC value 22 is retrieved from the TX SRAM 444 via SRAM controller 437. When the frame header processor 435 later determines that the CRC value 22 calculated by controller 412 is in the buffer, the frame-level CRC component 439 is instructed to replace that CRC value 22 with the original value 22 retrieved from SRAM 444. As explained below, it will also be necessary to alter the end-of-frame delimiter 24 before the data leaves module 430 out of TX out port 433. Note that in frame-level CRC mode, the CPU 450 is not responsible for comparing an exiting CRC value with an entering CRC value, hence there is no need to calculate a CRC value on outbound data in CRC generator 436.

Figure 14:
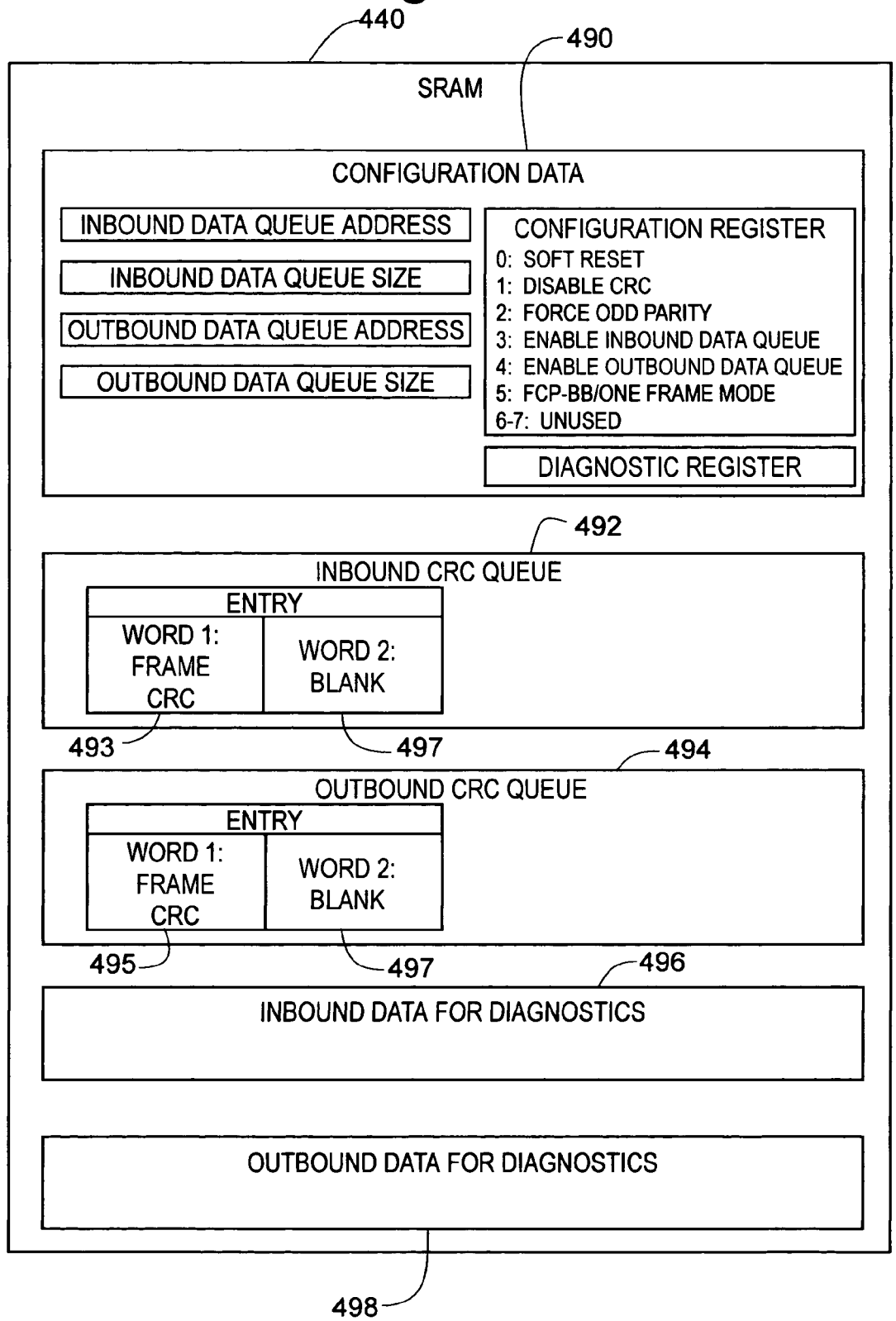
FIG. 14 is a block diagram showing the contents of the SRAM utilizing second embodiment inbound and outbound queues.

FIG. 14 shows the elements of SRAM 440, namely, configuration data 490, inbound CRC queue 492, outbound CRC queue 494, inbound data for diagnostics 496, and outbound data for diagnostics 498. Except for the structure of the two queues 492, 494, SRAM 440 operates in the same manner as SRAM 140 shown in FIG. 8.

In frame-level CRC mode, there is no need to maintain an intermediate, calculated CRC value across multiple frames of the same sequence. This is because there are no multi-frame sequences in this mode. As a result, there is no need for the queue indexing scheme described above which tracks entries in queues 210, 220 through the use of exchange identifiers. Instead, a simple, circular queue can be utilized to maintain the CRC values in the order that the frames 10 pass through the fibre channel interface 410. Thus, when in frame-level CRC mode, SRAM 440 maintains both inbound CRC queue 492 and outbound CRC queue 494 using a simple, circular queue and index. In addition, since there are no intermediate CRC values, there is no need to maintain the status word 212, 222 that is maintained when handling multiple frames per sequence. Thus, each entry in inbound queue 492 and outbound queue 494 contains only a single word 493, 495 that stores the frame-level CRC value 22. However, for the sake of consistency between queue entry sizes between modes of operation, a blank word 497 is appended to each of the CRC value words 493, 495.

Figure 15:
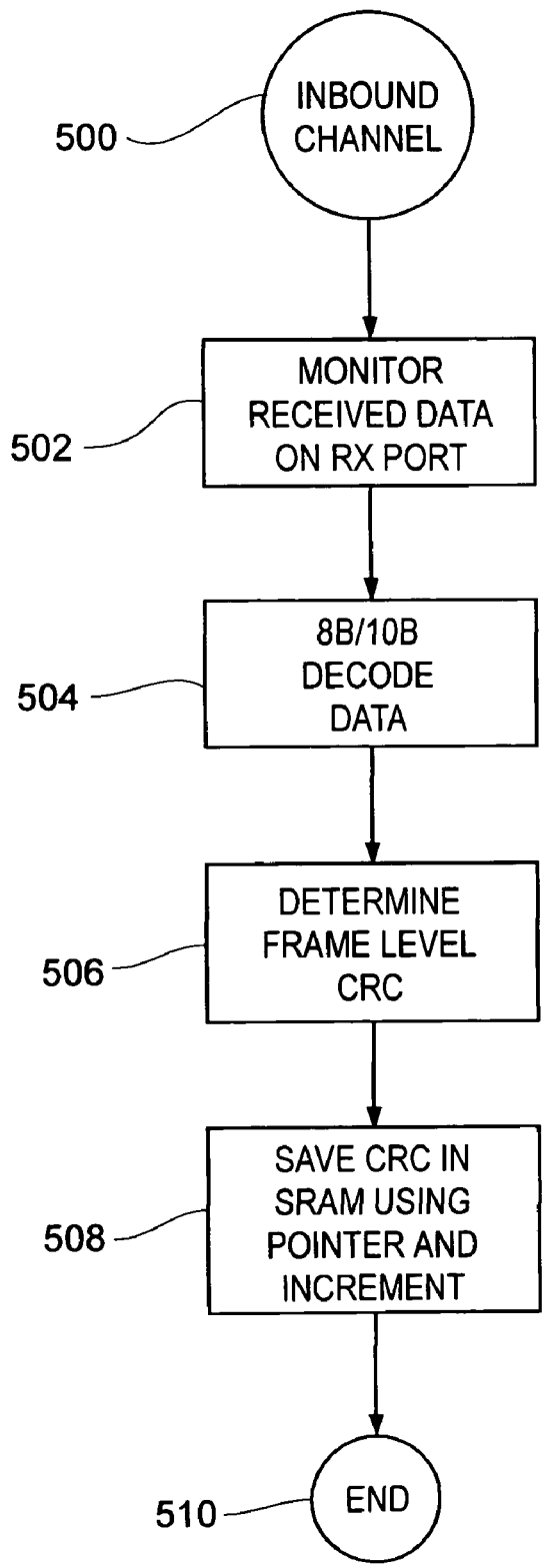
FIG. 15 is a flow chart showing a method for storing a frame-level CRC value.
Figure 16:
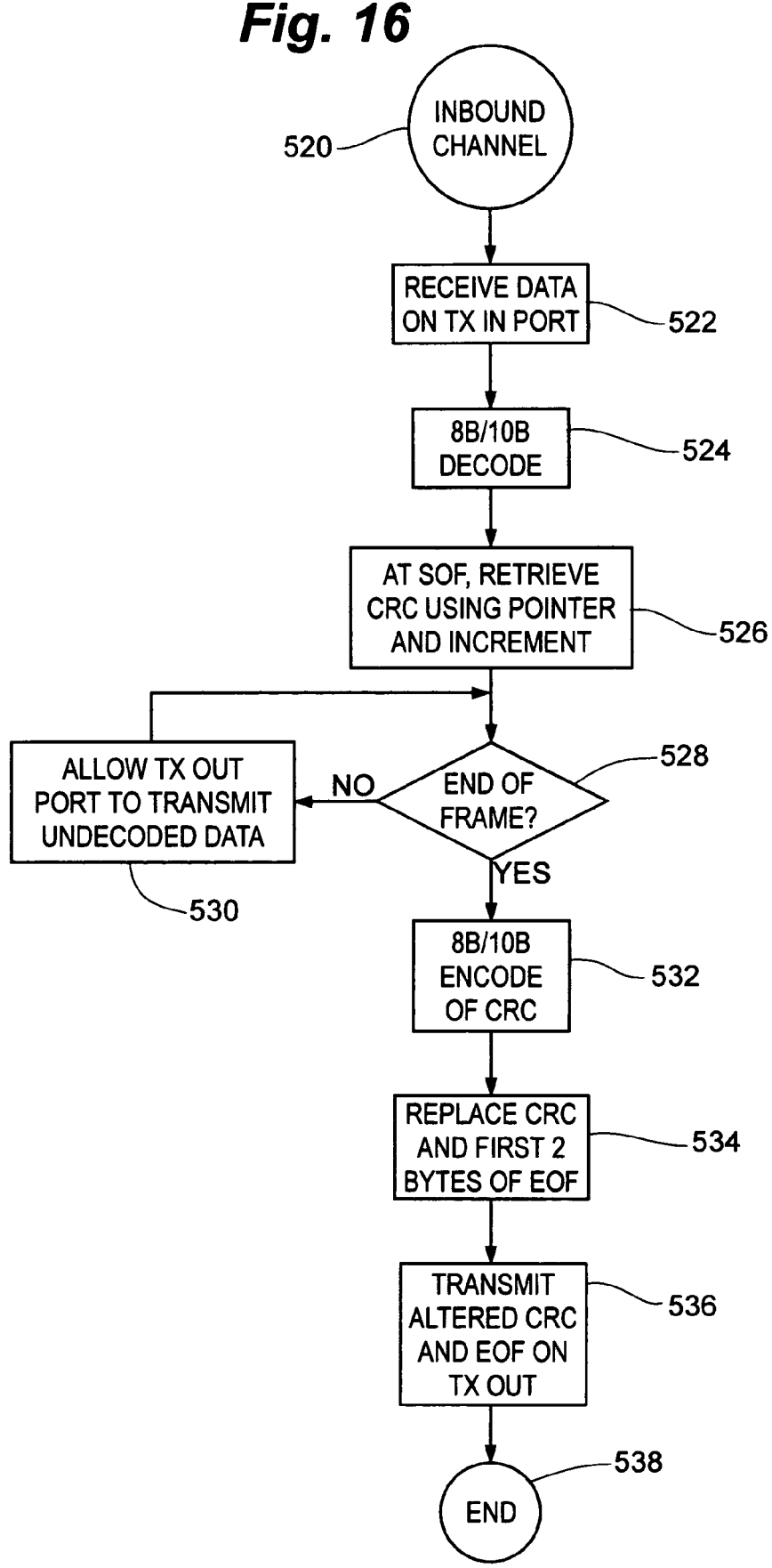
FIG. 16 is a flow chart showing a method for restoring a frame-level CRC value.

The method for handling frame-level CRC values in frame-level CRC mode is shown in the flow charts of FIGS. 15 and 16. FIG. 15 shows the method 500 for handling incoming data frames 10 on RX port 431. First, RX port 431 is monitored for data being received by the external interface 414 (step 502). The frame 10 being monitored is 10B encoded, so it must be 8B/10B decoded at decoder 434 before it is analyzed, which occurs at step 504. Next, the frame header processor 435 extracts the frame-level CRC value 22 from the received frame (step 506). Once the CRC value 22 is obtained, the SRAM controller 437 can then store the value 22 in RX SRAM 442. This is accomplished in step 508 by placing the frame-level CRC value 22 in the inbound CRC queue 492 according to the current inbound queue pointer. The pointer is then incremented to point to the next entry in the inbound queue 492. When this is completed, the method 500 is complete (step 510).

The method 520 for handling outgoing data frames 10 in frame-level CRC mode is shown in FIG. 16. First, TX In port 432 receives all outgoing data generated by the fibre channel controller 412 at step 522. This data must be 8B/10B decoded in component 434 (step 524). This decoding allows the frame header processor 435 to determine in real time the various elements of the fibre channel frame 10, such as the start-of-frame delimiter 12, the beginning and end of the data payload 16, the frame-level CRC value 22, and the end-of frame delimiter 24.

At the start of each frame 10, the CRC module 430 will retrieve the stored CRC value stored in the outbound CRC queue 494. This occurs in step 526, which also increments the pointer to queue 494 to point to the next frame-level CRC entry 495 in the queue 494.

Step 528 then determines if the end of the frame 10 has been reached in order to determine when the CRC value 22 generated by Fibre Channel controller 412 should be replaced. If not, the data being received over TX In port 432 is simply transmitted unaltered over TX Out port 433 to SERDES 418 at step 530. When the end of the frame 10 is reached, step 532 encodes the CRC value 22 that was retrieved in step 526. This encoded CRC value 22 is then used in step 534 to replace the CRC value that has just been received across TX In port 432. It is also necessary to alter the first two bytes of the end-of-frame delimiter 24, since this portion carries the running disparity value that must now match the newly replaced CRC value 22. Step 536 then allows the frame-level CRC component 439 to transmit the altered CRC value 22 and end-of-frame delimiter 24 out the TX Out port 433. The method 520 then terminates at step 538.

In order to allow the time necessary to replace the CRC value 22 and the end-of-frame delimiter 24 without slowing down the data transmission through TX Out port 433, the frame-level CRC component 439 must have a buffer to temporarily store data. Thus, when the CRC module 430 detects the end-of-frame delimiter 24 on TX in 432, the CRC value 22 and the end-of-frame delimiter 24 will already be loaded in the buffer of component 439. The alteration of value 22 and delimiter 24 will occur within this buffer. Thus, steps 532 and 534 of FIG. 16 must be completed before the buffer in component 439 is ready to transmit the CRC value 22 through TX Out 433.

CONCLUSION

It is to be understood that the above description is intended to be illustrative, and not restrictive. Modifications and variations may be made to this description without departing from the spirit or scope of the invention. For example, although the CRC module 130 was described in connection with discrete modules 133-138, it would have been obvious to combine the functionality of the different modules into more or fewer logical divisions. Alternatively, although the invention was described above with various diagnostic abilities, it would be well within the scope of the present invention to incorporate other diagnostic abilities or even no diagnostic functionality whatsoever. In addition, while the above description described the use of an SRAM 140 located on the fibre channel interface 110 but separate from CRC module 130, it would be obvious to use a different type of memory structure to share information between CRC module 130 and CPU 150. For instance, the memory structure could be located within the silicon defining the CRC module 130, or even could be located physically separate from the fibre channel interface 110 altogether. Consequently, the scope of the invention should be determined solely with reference to the appended claims, along with the full scope of equivalents to which such claims are entitled.

What is claimed is:

1. A fibre channel interface to a fibre channel communications line comprising:
   a) an external interface connected to the communications line so as to receive and transmit fibre channel frames having headers and data payloads over the communications line;
   b) a fibre channel controller converting frames received from the external interface into data and for converting data into frames to be transmitted by the external interface; and
   c) a CRC module connected between the external interface and the fibre channel controller, the CRC module connected so as to monitor data flowing from the external interface to the fibre channel controller and connected so as to have data flowing from the fibre channel controller to the external interface pass through the CRC module; the CRC module having
   i) a first CRC generator that generates a CRC value based on a starting value and data to be analyzed,
   ii) a first frame header processor with circuitry to analyze headers and transmit data payloads to the CRC generator as data to be analyzed,
   iii) a first memory in communication with the first CRC generator, and
   iv) a frame-level CRC component having a buffer, the data flowing from the fibre channel controller being stored temporarily in the buffer before being passed to the external interface;
d) wherein the fibre channel interface operates in a first mode by generating a sequence-level CRC across multiple frames by storing intermediate CRC values for a sequence in the first memory for later use by the first CRC generator as the starting value when analyzing a next frame in the sequence; and
e) wherein the fibre channel interface operates in a second mode wherein a newly generated frame level CRC value generated by the fibre channel controller is replaced in the buffer of the frame-level CRC component by an previous frame level CRC value.

2. The fibre channel interface of claim 1, further comprising a queue in the first memory for storage of and retrieval of intermediate CRC values according to a queue index.

3. The fibre channel interface of claim 2, wherein the queue index is the same as an exchange ID that is determined by the fibre channel interface.

4. The fibre channel interface of claim 3, further comprising a queue in the first memory for storage and retrieval of the data payload data used to calculate the CRC value.

5. The fibre channel interface of claim 1, wherein the first frame header processor passes less than all of the data payloads monitored by the CRC module based upon the analysis of the headers.

6. The fibre channel interface of claim 1, wherein the fibre channel controller has a memory interface in communication with the first memory of the CRC module, and further wherein the fibre channel controller has a bus interface for allowing accessing to the first memory of the CRC module over the bus interface.

7. In a switching platform having
a) a communications bus;
b) a system buffer connected to the communications bus;
c) a first interface connected the communications bus;
d) a fibre channel interface connected to a fibre channel communications line and the communications bus; and
e) a processor connected to the communications bus, the processor translating data between the first interface and the fibre channel interface using the system buffer as temporary storage;
an improved fibre channel interface wherein the fibre channel interface comprises:
   i) a fibre channel controller for generating fibre channel frames including a frame-level CRC value from data received from the communications bus and for extracting the data payload from frames received from the fibre channel communications line;
   ii) a CRC generator that generates a CRC value based on a staffing value and data to be analyzed;
   iii) a frame header processor that monitors communications between the fibre channel controller and the fibre channel communications line at the level of a fibre channel frame, the frame header processor having circuitry to analyze a header within the frame to determine the type of data within the frame and a sequence to which the frame belongs, the frame header processor being in communication with the CRC generator so as to transmit a data payload of the frame to the CRC generator as data to be analyzed;
   iv) memory in communication with the CRC generator that stores intermediate CRC values for later use by CRC generator as the starting value when analyzing a next frame in the sequence;
   v) a frame-level CRC component having a buffer, the data flowing from the fibre channel controller being stored temporarily in the buffer before being passed to the external interface;
   wherein the fibre channel interface operates in a first mode by generating a sequence-level CRC across multiple frames by storing intermediate CRC values for a sequence in the memory for later use by the first CRC generator as the starting value when analyzing a next frame in the sequence; and
   wherein the fibre channel interface operates in a second mode wherein a newly generated frame level CRC value generated by the fibre channel controller is replaced in the buffer of the frame-level CRC component by a previous frame level CRC value forwarded to the fibre channel interface over the communications bus.

8. The switching platform of claim 7, wherein, in the first mode, the frame header processor selectively transmits the data payload of the frame to the CRC generator based on the header of the frame.

9. The switching platform of claim 7, wherein, in the first mode, data being transmitted from fibre channel interface to the first interface is altered by the processor by appending the final sequence-level CRC calculation stored in memory to the data of the sequence.

10. The switching platform of claim 9, wherein, in the second mode, data being transmitted from fibre channel interface to the first interface is altered by the processor by appending a frame-level CRC value found in the frame received over the fibre channel communications line to the data payload of the frame.

11. The switching platform of claim 7, wherein, in the second mode, data being transmitted from fibre channel interface to the first interface is altered by the processor by appending a frame-level CRC value found in the frame received over the fibre channel communications line to the data payload of the frame.

12. The switching platform of claim 7, wherein, in the first mode, the data being transmitted from the first interface to the fibre channel interface contains an expected, sequence-level CRC value appended to the data, wherein the CPU strips the expected CRC value before submitting the data to the fibre channel interface.

13. The switching platform of claim 11, wherein the CPU compares the stripped-off expected CRC value with the CRC value calculated for the data by the CRC generator.

14. The switching platform of claim 11, wherein the fibre channel interface further comprises CRC compare circuitry that compares the final sequence-level CRC calculation to the stripped-off expected CRC value.

15. The switching platform of claim 7, wherein, in the second mode, the data being transmitted from the first interface to the fibre channel interface contains an frame-level CRC value appended to the data, wherein the CPU strips the expected CRC value before submitting the data to the fibre channel interface, and wherein the newly generated frame level CRC value generated by the fibre channel controller is replaced in the buffer of the expected CRC value.

16. The switching platform of claim 7, wherein the first interface is a wide area network interface.

17. The switching platform of claim 7, wherein the first interface is a channel interface.

* * * * *